United States Patent
Koezuka et al.

(10) Patent No.: US 9,483,675 B2
(45) Date of Patent: Nov. 1, 2016

(54) IMAGE DISPLAY PROCESSING DEVICE AND DISPLAY PROCESSING PROGRAM

(71) Applicant: OMRON CORPORATION, Kyoto (JP)

(72) Inventors: Yahiro Koezuka, Kyoto (JP); Shuichi Matsui, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 14/561,578

(22) Filed: Dec. 5, 2014

(65) Prior Publication Data

US 2015/0227771 A1    Aug. 13, 2015

(30) Foreign Application Priority Data

Dec. 24, 2013 (JP) ................................ 2013-265333

(51) Int. Cl.
G06K 7/10       (2006.01)
G06K 7/00       (2006.01)
G06F 3/00       (2006.01)

(52) U.S. Cl.
CPC ........... *G06K 7/10366* (2013.01); *G06F 3/002* (2013.01); *G06K 7/0095* (2013.01); *G06K 7/10168* (2013.01); *G06K 7/10217* (2013.01); *G06K 7/10465* (2013.01)

(58) Field of Classification Search
CPC ........... G06K 7/10366; G06K 7/0095; G06K 7/10168; G06K 7/10217; G06K 7/10465; G06F 3/002
See application file for complete search history.

(56) References Cited

U.S. PATENT DOCUMENTS

| | | |
|---|---|---|
| 7,225,992 B2 | 6/2007 | Forster |
| 7,429,925 B2 | 9/2008 | Sugiyama et al. |
| 8,519,829 B2 | 8/2013 | Koezuka et al. |
| 2004/0160233 A1 | 8/2004 | Forster |
| 2005/0159913 A1* | 7/2005 | Ariyoshi ............ G06K 7/10465 702/122 |
| 2005/0223286 A1* | 10/2005 | Forster ................. G06K 7/0008 714/25 |
| 2005/0248439 A1 | 11/2005 | Sugiyama et al. |
| 2009/0231107 A1* | 9/2009 | Sato ..................... H04B 5/0062 340/10.3 |
| 2012/0235799 A1 | 9/2012 | Yamasaki |

FOREIGN PATENT DOCUMENTS

| | | |
|---|---|---|
| EP | 1990784 | 11/2008 |
| JP | 2005-322029 | 11/2005 |
| JP | 2011-59240 | 3/2011 |

OTHER PUBLICATIONS

U.S. Appl. No. 14/561,583 to Yahiro Koezuka et al., filed Dec. 5, 2014.
Extended European Search Report in EP 14196113.6, dated Jun. 25, 2015.

* cited by examiner

Primary Examiner — Leon Flores
(74) Attorney, Agent, or Firm — Greenblum & Bernstein, P.L.C.

(57) ABSTRACT

The invention provides an image display processing device and an image display processing program for displaying information concerning diagnosis of correspondence with an RF tag. The image display processing device includes a unit for obtaining diagnostic information concerning correspondence when correspondence between the RF tag and an RFID reader/writer has been successful, and a display controller configured to make a display unit display an image based on the diagnostic information. The diagnostic information includes correspondence margin based on a characteristic value obtained from the correspondence signal.

12 Claims, 27 Drawing Sheets

FIG. 20

| | Data name "text character string" *1 | Size | Data type *2 | Content "text character string" *1 |
|---|---|---|---|---|
| RD3 | Query | 2Byte | UINT (STRING) | Query type at correspondence diagnosis time<br>0x0001 : UIDRead<br>0x0002 : DataRead<br>0x0003 : DataWrite<br>0x0004 : Lock<br>0x0005 : DataFill<br>0x0006 : WriteCount<br>0x0007 : DataRestore<br>0x0008 : DataCopy |
| RD4 | ResponseResult | 2Byte | UINT (STRING) | Error code at correspondence diagnosis time<br>0x0000: Normal<br>0x0001: Cancel communications<br>0x0002: Abort communications<br>0x2001: RF Tag missing error<br>0x2002: RF Tag communication error<br>0x2003: ID mismatch error<br>0x2004: RF Tag address error<br>0x2005: RF Tag lock error<br>0x2006: RF Tag verification error<br>0x2007: RF Tag data lost error<br>0x2008: RF Tag system error<br>0x2009: RF Tag overwriting error<br>0x200A: Reader/Writer connection error |
| RD5 | DiagnosticResult | 2Byte | UINT (STRING) | Result at correspondence diagnosis time<br>0x0000: Good<br>0x0001: Output level low<br>0x0002: Receiving level low<br>0x0003: Noise level high<br>0x0004: Signal/Noise level low<br>0xFFFF: N/A<br>When correspondence result is "abnormal", 0xFFFF (fixed) |

FIG. 21

| Notification item | Content |
|---|---|
| Transmission power shortage | Indicates that transmission power from reader/writer to RF tag is in shortage. Possible measures are that RF tag and reader/writer are set to face each other, distance is shortened, and surrounding metal objects are removed. |
| Reception power shortage | Indicates that return power from RF tag to reader/writer is in shortage. Possible measures are that RF tag and reader/writer are set to face each other, distance is shortened, and surrounding metal objects are removed. |
| S/N ratio shortage | Indicates that there is much surrounding noise to return power from RF tag to reader/writer. Possible measures are that RF tag and reader/writer are set to face each other, distance is shortened, surrounding metal objects are removed, a surrounding noise is reduced. |
| Noise excess | Indicates that there is too much surrounding noise to reader/writer. Possible measure is to reduce surrounding noise. |

| Transmission power | Point |
|---|---|
| N+9 | 1 |
| N+8 | 2 |
| : | : |
| N+1 | 9 |
| N | 10 |

Power large ↕ Power small

IMAGE DISPLAY PROCESSING DEVICE AND DISPLAY PROCESSING PROGRAM

CROSS-REFERENCE TO RELATED APPLICATION

This application is based on Japanese Patent Application No. 2013-265333 filed with the Japan Patent Office on Dec. 24, 2013, the entire contents of which are incorporated herein by reference.

FIELD

The present invention relates to an image display processing device and a display processing program for displaying an image concerning correspondence between an RF (Radio Frequency) tag and an RFID (Radio Frequency Identification) reader/writer. Particularly, the invention relates to an image display processing device and a display processing program for displaying diagnostic information concerning correspondence.

BACKGROUND

In the conventional communication system that includes an RF reader/writer and an RFID tag, there have been proposed various diagnostic functions concerning communication. For example, Japanese Unexamined Patent Publication No. 2005-322029 introduces a system that facilitates specification of a correspondence error factor between the RF tag and the reader/writer.

There is a description about the structure that the CPU diagnoses whether an "RF tag reader/writer" device has abnormality or the state of wireless communication to the RF tag has abnormality and the CPU notifies a diagnosis result to a high-order device.

The structure has a first step in which the CPU first transmits data to a wireless communication device and diagnoses presence or absence of abnormality in the wireless communication device based on presence or absence of a response to the data transmission, and a second step in which when the wireless communication device has been diagnosed as "normal" in the first step, the CPU transmits a wireless-communication execution command to the RF tag and diagnoses the state of wireless communication to the RF tag based on a result of response to the transmission. When the wireless communication device has been diagnosed as abnormal in the first step, the CPU notifies the abnormality, and when the wireless communication device has been diagnosed as abnormal in the second step, the CPU notifies the abnormality.

Japanese Unexamined Patent Publication No. 2011-59240 discloses the following system. In a reader/writer having a reference tag for test and an exclusive antenna circuit for corresponding with the reference tag, when the reader/writer cannot receive a reply signal from the reference tag from the exclusive antenna circuit, the CPU decides that the reader/writer device is in trouble. On the other hand, when the reader writer has been able to receive the reply signal from the reference tag from the exclusive antenna circuit, the CPU decides that the reader/writer device is normal.

SUMMARY

According to the configuration disclosed in Japanese Unexamined Patent Publication No. 2005-322029, abnormality in the device itself can be detected. However, when abnormality in correspondence with the RF tag has occurred, a user cannot know a cause of the correspondence abnormality. After abnormality has been detected, the user can know the state of abnormality for the first time. However, it is desirable that the user can know beforehand the state near the "abnormal state" to take measure before the abnormality has been detected. Japanese Unexamined Patent Publication No. 2005-322029 does not refer to this point.

According to the configuration disclosed in Japanese Unexamined Patent Publication No. 2011-59240, the exclusive antenna circuit and the reference tag need to be provided in the reader/writer device. Therefore, this has a disadvantage in that the in-casing area increases and the product cost also increases. When correspondence between the reader/writer and the RF tag has failed, causes of the correspondence failure include surrounding noise, tag installation distance/position, and the like, in addition to the reader/writer device trouble. However, Japanese Unexamined Patent Publication No. 2011-59240 does not disclose a function for notifying these causes to the user, and the user cannot know the causes.

Therefore, an object of the present invention is to provide an image display processing device and a display processing program for displaying information concerning diagnosis of correspondence with an RF tag.

According to a certain aspect of the present invention, the image display processing device includes a unit for obtaining diagnostic information concerning correspondence when correspondence between an RF tag and an RFID reader/writer has been successful, and a display controller configured to make a display unit display an image based on the diagnostic information. The diagnostic information includes correspondence margin based on a characteristic value obtained from the correspondence signal.

Preferably, the display controller displays the correspondence margin in different modes according to a level of the correspondence margin.

Preferably, the correspondence margin is displayed in different colors according to the level.

Preferably, guidance information for enhancing the correspondence margin is displayed by relating the guidance information to the correspondence margin.

Preferably, the correspondence margin and a characteristic value are displayed in relation to each other.

Preferably, the characteristic value is displayed in different colors according to the level of the related correspondence margin.

Preferably, a characteristic value is displayed by a graph.

Preferably, a characteristic value includes a normalized value of a characteristic value measured at the correspondence time.

Preferably, a correspondence margin and a harmonized average value of two or more characteristic values are displayed in relation to each other, and the harmonized average value includes a harmonized average value of transmission power and reception power measured at a correspondence time.

Preferably, a correspondence margin and a harmonized average value of two or more characteristic values are displayed in relation to each other, and the harmonized average value includes a harmonized average value of transmission power, reception power, and noise amount that have been measured at a correspondence time.

Preferably, diagnostic information includes a command type transmitted to an RF tag by a correspondence signal, and displays the command type in relation to a correspondence margin.

Preferably, diagnostic information includes command execution time, a correspondence result, an abnormality content of correspondence abnormality, and a cause of reduction in correspondence margin, and displays command execution time, a correspondence result, an abnormality content of correspondence abnormality, and a cause of reduction in correspondence margin, in relation to the correspondence margin.

According to other aspect of the present invention, there is provided an image display processing program that is executed by a computer. The computer is made to function as a unit configured to obtain diagnostic information concerning correspondence when correspondence between an RF tag and an RFID reader/writer has been successful, and a display controller configured to make a display unit display an image based on the diagnostic information. The diagnostic information includes correspondence margin based on a characteristic value obtained from a correspondence signal.

According to the present invention, concerning diagnosis of correspondence with an RF tag, information of correspondence margin at a correspondence success time is displayed by an image.

BRIEF DESCRIPTION OF THE DRAWINGS

FIG. 20 illustrates an example of the content of query type RD3, correspondence result RD4, and diagnosis result RD5;

FIG. 21 explains a table MT according to the second embodiment of the present invention;

FIG. 26 is a graph explaining a normalization method of reception power according to the second embodiment of the present invention;

DETAILED DESCRIPTION

Figure 1:
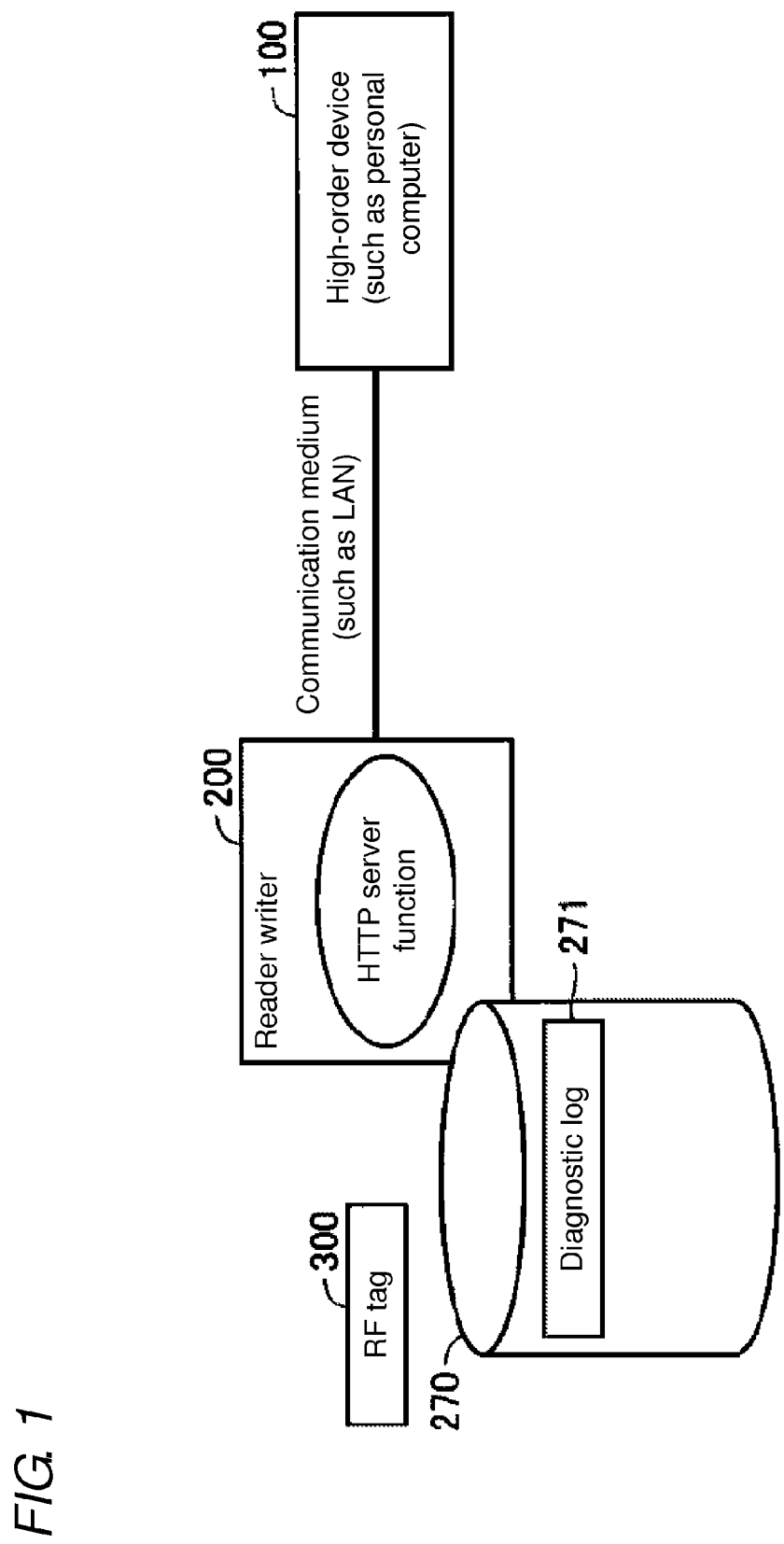
FIG. 1 is a configuration diagram of a system according to a first embodiment of the present invention.

Embodiments of the present invention will be described in detail with reference to the drawings. In the drawings, identical or equivalent portions will be attached with standardized signs, and description of these portions will not be repeated.

First Embodiment

System Configuration

FIG. 1 is a configuration diagram of a system according to an embodiment of the present invention. The system includes a high-order device 100 such as a PLC (Programmable logic controller) and a personal computer, an RFID reader/writer 200, and an RF tag 300 that includes a memory. The high-order device 100 communicates with the RFID reader/writer 200 by a communication medium (wire or wireless) such as a LAN (Local Area Network), and the RF tag 300 communicates with the RFID reader/writer 200 by wireless. The RFID reader/writer 200 stores a diagnostic log 271 in a storage 270 described later.

In the first embodiment, communication of the RFID reader/writer 200 includes correspondence with the RF tag 300. In correspondence, in order to read and write information to the memory of the RF tag 300, the RFID reader/writer 200 and the RF tag 300 transmit and receive a command such as a query and a response (data) to each other.

The system in FIG. 1 is provided in a management site of luggages and in an assembly line in a factory, for example. The RF tag 300 is fitted to an article conveyed on the line, and has a memory medium into which various information has been written. The RFID reader/writer 200 reads/writes by non-contact, information from/to the memory medium by wireless communication with the RF tag 300, and transmits the information concerning the communication with the RF tag 300 to the high-order device 100. The high-order device 100 processes the information received from the RFID reader/writer 200. A user can confirm a read/write result of the RF tag 300 from the RFID reader/writer 200 or the high-order device 100.

Because the RF tag 300 and the RFID reader/writer 200 of the system in FIG. 1 are generally introduced in the environments where various devices are installed, there is a risk of occurrence of a correspondence error. Therefore, in the system in FIG. 1, a correspondence diagnostic function for diagnosing a correspondence state is provided. Causes of the correspondence error can be the influence of external noise, a correspondence distance between the RF tag 300 and the RFID reader/writer 200, and a metal surrounding the RFID reader/writer 200 or the RF tag 300.

(Configuration of High-Order Device 100)

Figure 2:
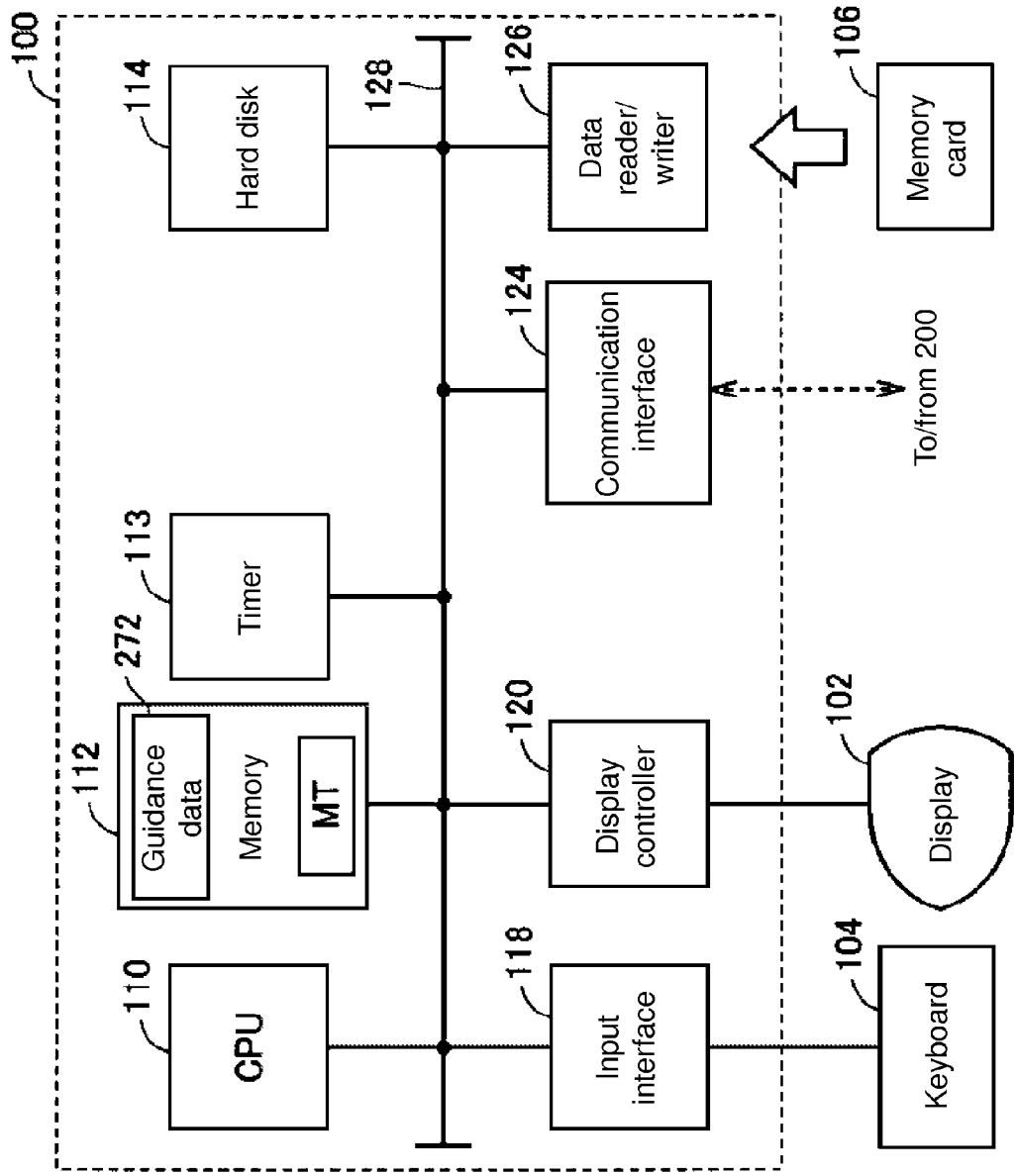
FIG. 2 is a schematic configuration diagram of a high-order device 100 according to the first embodiment of the present invention.

FIG. 2 is a schematic configuration diagram of the high-order device 100 according to the embodiment of the present invention. In FIG. 2, the high-order device 100 includes a CPU (Central Processing Unit) 110 as an operation processor, a memory 112 as a storage, a hard disk 114, a timer 113 that counts time and outputs time-count data to the CPU 110, an input interface 118, a display controller 120, a communication interface 124, and a data reader/writer 126. These parts are connected to each other so that communication can be performed, via bus 128.

The CPU 110 implements various operations, by executing a program (code) stored in the hard disk 114. The memory 112 is representatively a volatile memory unit such as a DRAM (Dynamic Random Access Memory), and stores data received from the RFID reader/writer 200, work data, and the like, in addition to program data read from the hard disk 114. The memory 112 stores guidance data concerning a correspondence diagnostic processing which has been downloaded from the RFID reader/writer 200.

The input interface 118 mediates data transmission between the CPU 110 and input units such as a keyboard 104, a mouse (not shown) 103, and a touch panel (not shown). That is, the input interface 118 receives an operation instruction that is given by the user who operates the input units.

The display controller 120 is connected to a display 102 as a representative example of a display device, and notifies a result of processing by the CPU 110 and the like to the user by displaying the processing result.

The communication interface 124 mediates data transmission between the CPU 110 and the RFID reader/writer 200 via a LAN. The data reader/writer 126 mediates data transmission between the CPU 110 and a memory card 106 as a recording medium.

When necessary, other output unit such as a printer may be connected to the high-order device 100.

(Configurations of RFID Reader/Writer 200 and RF Tag 300)

Figure 3:
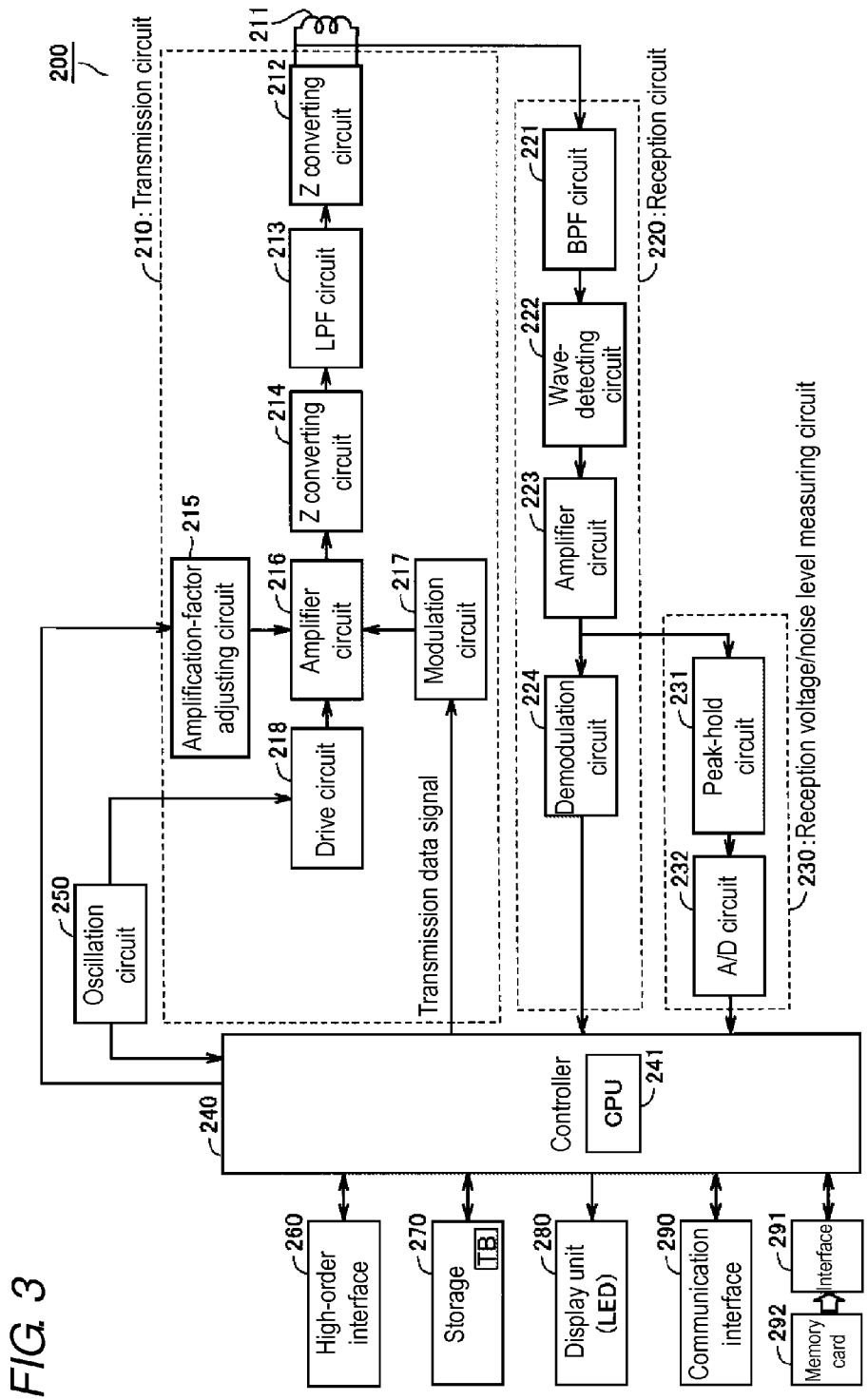
FIG. 3 is a configuration diagram of an RFID reader/writer 200 according to the first embodiment of the present invention.
Figure 4:
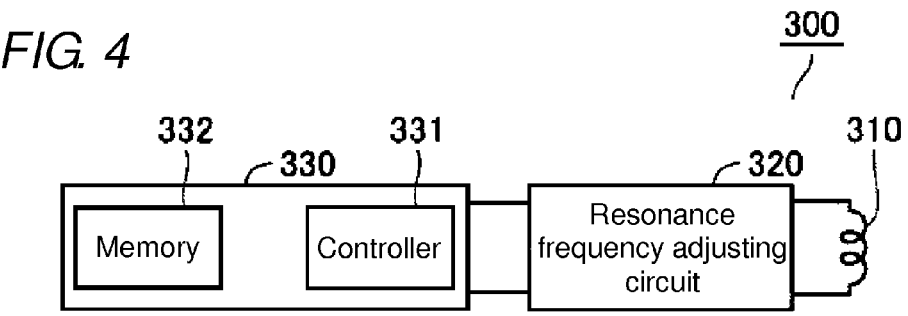
FIG. 4 is a configuration diagram of an RF tag 300 according to the first embodiment of the present invention.

FIG. 3 is a configuration diagram of the RFID reader/writer 200 according to the embodiment of the present invention. FIG. 4 is a configuration diagram of the RF tag 300 according to the embodiment of the present invention. Configurations of the RFID reader/writer 200 and the RF tag 300 that perform correspondence with each other will be described with reference to FIG. 3 and FIG. 4. In the first embodiment, the RF tag 300 in FIG. 4 does not incorporate a power supply, and is what is called a passive type tag that operates by induced electromotive force generated from a transmission wave from the RFID reader/writer 200, and includes an IC circuit 330 which includes a controller 331 and a semiconductor memory 332, and a communication unit. The communication unit includes an antenna coil 310, resonance frequency adjusting circuit 320 (a capacitor), and the like. The controller 331 also includes a modem circuit and the like for modulating or demodulating a communication signal with the RFID reader/writer 200, in addition to the computer. The RF tag 300 to be applied is not limited to the passive type, and may be a type that incorporates a power supply.

In FIG. 3, the RFID reader/writer 200 includes: a communication unit for performing communication including correspondence with the RF tag; a reception voltage/noise level measuring circuit 230; a controller 240 that includes a CPU (Central Processing Unit) 241; a high-order interface 260 as a communication module for communicating with the high-order device 100; a storage 270 as a volatile or non-volatile memory medium such as a ROM (Read Only Memory) and a RAM (Random Access Memory); a display unit 280 that includes a numerical-value display unit, a plurality of indicating lamps (LED: Light Emitting Diode), and the like; a communication interface 290 for communicating with the external network; and an interface 291.

The communication unit includes an antenna coil 211, a transmission circuit 210, a reception circuit 220, and an oscillation circuit 250.

An interface 291 mediates data transmission between the CPU 241 and a memory card 292 as a recording medium. That is, a program and the like to be executed by the RFID reader/writer 200 are distributed to the memory card 292 in a stored state, and the interface 291 reads the program from the memory card 292. The interface 291 writes a processing result concerning communication with the high-order device 100 or the RF tag 300 into the memory card 292, in response to an internal instruction of the CPU 241. The memory card 292 includes a general-purpose semiconductor storage device such as a CF (Compact Flash) and an SD (Secure Digital), a magnetic storage medium such as a flexible disk, and an optical storage medium such as a CD-ROM (Compact Disk Read Only Memory).

The CPU 241 of the controller 240 executes a communication processing with the high-order device 100 or a correspondence processing with the RF tag 300, based on the program stored in the memory such as the storage 270. Controller 240 outputs a high frequency pulse that becomes a source of a carrier, based on a pulse signal from the oscillation circuit 250. At the time of correspondence with the RF tag 300, the controller 240 outputs a transmission data signal that expresses the command (hereinafter, the output signal will be also referred to as "command signal").

The storage 270 stores various programs and data. This data includes a table TB to be referred to (searched) by the CPU 241 when implementing a correspondence diagnostic processing, and a table MT to be referred to (searched) for notifying (outputting) a diagnosis result.

The transmission circuit 210 includes a drive circuit 218, a modulation circuit 217, an amplifier circuit 216 having a variable amplification factor, a Z converting circuits 212 and 214, an LPF (low-pass filter) circuit 213, and an amplification-factor adjusting circuit 215 for changing the amplification factor.

The reception circuit 220 includes a BPF (bandpass filter) circuit 221, a wave-detecting circuit 222, an amplifier circuit 223, and a demodulating circuit 224.

The reception voltage/noise level measuring circuit 230 includes a peak-hold circuit 231 for taking out the level of the reception signal of the reception circuit 220 as digital data, and an A/D (Analog/Digital conversion) circuit 232.

(Correspondence Operation)

In the correspondence operation between the RFID reader/writer 200 and the RF tag 300 illustrated in FIG. 3 and FIG. 4, both when the RF tag 300 reads information from the RFID reader/writer 200 and when the RF tag 300 writes information to the RFID reader/writer 200, the RFID reader/writer 200 transmits a command received from the high-order device 100, to the RF tag 300 and receives a response to the command, from the RF tag 300, and the RFID reader/writer 200 transmits a response content to the high-order device 100. At the correspondence time, because the RF tag 300 does not have an internal power supply, the control circuit in the RF tag 300 is driven by generating induced electromotive force in the antenna coil 310 at the RF tag 300 side by transmission wave from the antenna coil 211.

In correspondence, the controller 240 of the RFID reader/writer 200 appropriately outputs a command signal of a predetermined bit number while oscillating a carrier signal of 13.56 MHz based on the output signal of the oscillation circuit 250. The carrier signal is converted into a carrier by the drive circuit 218, and is then amplified by the amplifier circuit 216. The amplified carrier signal is impedance-match processed by the Z converting circuits 214 and 212, and is filter-processed by the LPF circuit 213. The processed carrier signal is supplied to the antenna coil 211, and is transmitted from the antenna coil 211 as an electromagnetic wave. The modulation circuit 217 amplitude-modulates the carrier based on the command signal, so that the command signal is superposed with the carrier. The correspondence frequency is not limited to 13.56 MHz.

When the carrier has been transmitted from the antenna coil 211 by the above operation, induced electromotive force is generated in the RF tag 300 in the correspondence region by the carrier, and the controller 331 at the RF tag 300 side is started. When the carrier superposed with the command signal has been transmitted from the antenna coil 211 in this state, the controller 331 of the RF tag 300 executes the instructed processing by decoding the command expressed by the command signal. Thereafter, the controller 331 generates a response (a response signal) that expresses response data, and replies the response signal to the RFID reader/writer 200.

The reception circuit 220 of the RFID reader/writer 200 receives the reply from the RF tag 300. After the BPF circuit 221 has removed noise from the reception signal, the wave-detecting circuit 222 extracts the response signal. The amplifier circuit 223 amplifies the extracted response signal, and thereafter, the demodulating circuit 224 converts the amplified response signal into digital data, and outputs the digital data to the controller 240. The CPU 241 decodes the response content of the RF tag 300 from the digital data from the demodulating circuit 224, and outputs correspondence result data that includes the decoded data. For example, the CPU 241 transmits the correspondence result data to the high-order device 100, or stores the correspondence result data in the storage 270, or displays in the display unit 280, or lights the LED.

The reception signal that has been output from the amplifier circuit 223 is output to the reception voltage/noise level measuring circuit 230. In the reception voltage/noise level measuring circuit 230, the peak-hold circuit 231 wave-detects the received response signal. Specifically, the peak-hold circuit 231 generates a signal (an envelope signal) that expresses the change in the voltage level as a peak value of each amplitude of the response signal. The A/D conversion circuit 232 digitally converts the envelope signal from the peak-hold circuit 231, and outputs the digitally-converted data to the controller 240.

In the embodiment, because the passive tag that does not incorporate a power supply is used for the RF tag 300, the communication system between the RFID reader/writer 200 and the RF tag 300 is a half-duplex system, the antenna is shared for transmission and for reception, and the transmission signal and the reception signal are separated.

(Functional Configuration)

Figure 5:
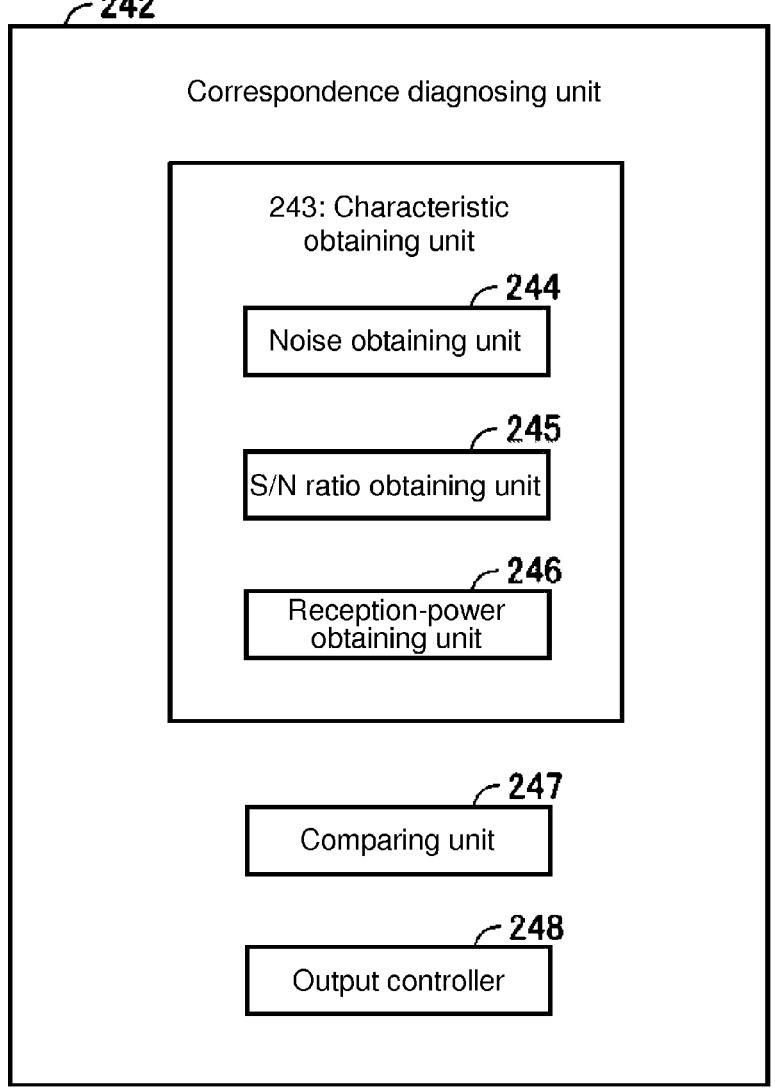
FIG. 5 is a functional configuration diagram of the RFID reader/writer 200 according to the first embodiment of the present invention.

FIG. 5 is a functional configuration diagram of the RFID reader/writer 200 according to the embodiment of the present invention. In FIG. 5, the RFID reader/writer 200 includes a correspondence diagnosing unit 242 for diagnosing correspondence by the communication unit with the RF tag 300 when the correspondence has been successful. The correspondence diagnosing unit 242 includes a characteristic obtaining unit 243 for obtaining a characteristic concerning correspondence with the RF tag 300, a comparing unit 247 that compares between a value indicated by the obtained characteristic and a threshold value for guaranteeing a stable correspondence operation, and an output controller 248 that makes the output unit output correspondence margin which indicates the level by which the value indicated by the obtained characteristic is higher or lower than the threshold value. The correspondence margin expresses information concerning whether a stable correspondence operation is possible.

The characteristic obtaining unit 243 includes a noise obtaining unit 244 that obtains a noise amount around the RFID reader/writer 200 by transmitting only the carrier, an S/N ratio obtaining unit 245 that obtains an S/N ratio by calculating the S/N ratio from the electric power of the reception signal and the noise amount, and a reception-power obtaining unit 246 that obtains reception power from the output of the reception voltage/noise level measuring circuit 230.

Each part illustrated in FIG. 5 is realized by the program executed by the CPU 241, or is realized by combination of the program and circuits.

(Correspondence Diagnostic Processing)

The correspondence diagnostic processing that is implemented by the correspondence diagnosing unit 242 will be described. In the embodiment, the following diagnostic function is held based on the noise amount, the S/N ratio, the reception power, and the transmission power that are characteristic values concerning correspondence. These characteristic values are parameters that can influence the correspondence performance, but the characteristic values to be used for the diagnosis are not limited to these kinds of characteristic values.

<Noise Diagnosis>

It is decided what level of noise (electric waves oscillated by the switching power supply, the motor, the inverter, and other RFID reader/writer) amount generated in the RFID reader/writer 200 and the RF tag 300 and the surrounding of the RF tag 300 is present relative to a predetermined threshold value.

<S/N Ratio Diagnosis>

It is decided what level of noise amount to an electric wave (electric power) amount that the RF tag 300 returns to the RFID reader/writer 200 is present relative to a predetermined threshold value.

<Reception Power Diagnosis>

It is decided what level of electric waves (electric power) that the RF tag 300 returns to the RFID reader/writer 200 has reached the RFID reader/writer 200 based on a predetermined threshold value.

<Transmission Power Diagnosis>

It is decided what level of electric waves (electric power) that the RFID reader/writer 200 transmit has reached the RF tag 300.

(Schematic Processing Flow)

Figure 6:
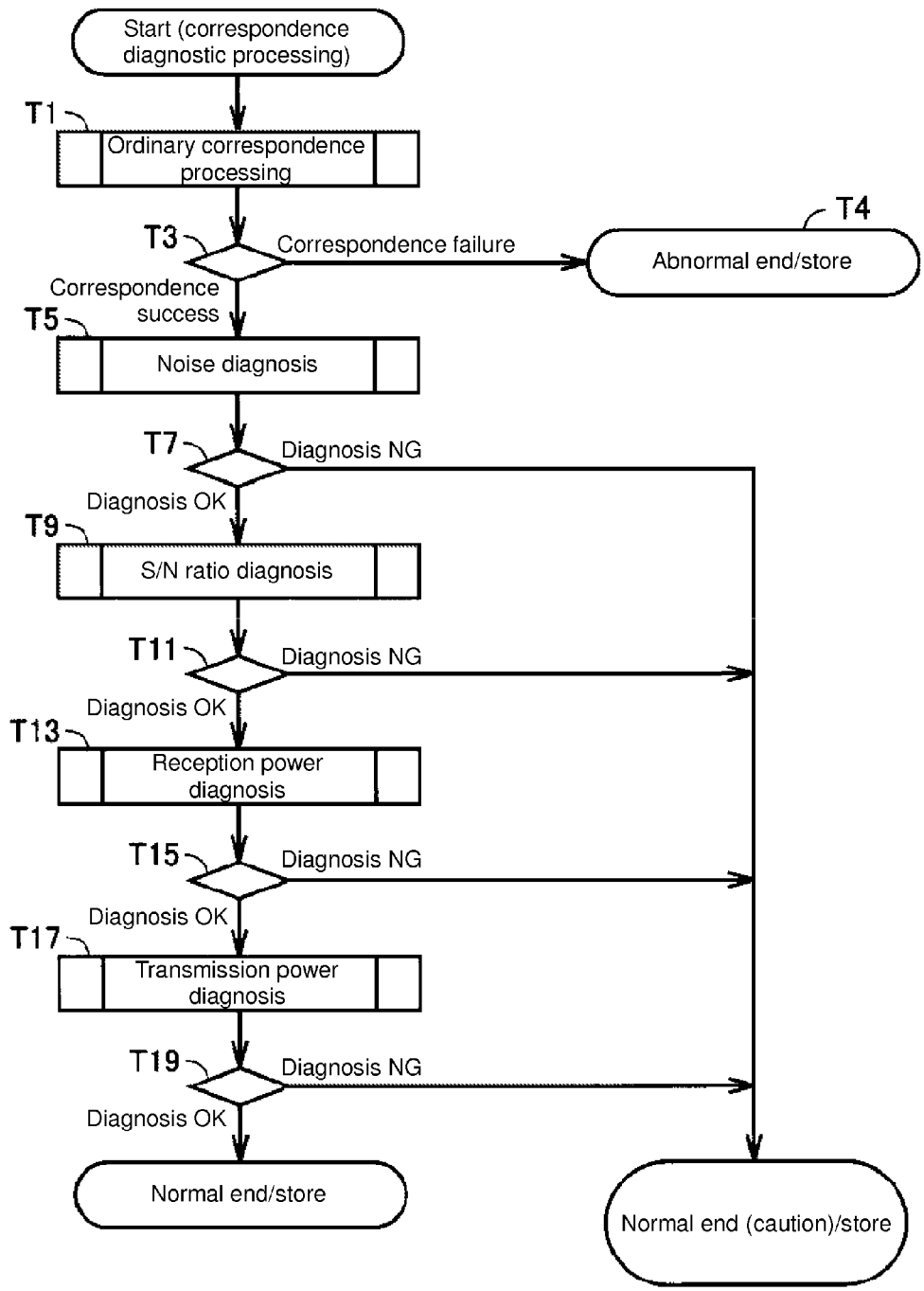
FIG. 6 is a flowchart of correspondence diagnostic processing according to the first embodiment of the present invention.

FIG. 6 is a flowchart of a correspondence diagnostic processing according to the embodiment of the present invention. It is assumed that the RF tag 300 is positioned at a distance from the RFID reader/writer 200 where the RF tag 300 can perform ordinary correspondence with the RFID reader/writer 200. In FIG. 6, first, an ordinary correspondence processing is implemented in which the RFID reader/writer 200 transmits a command to the RF tag 300, and receives a response signal from the RF tag 300 (Step T1).

The controller 240 (more specifically, CPU 241) of the RFID reader/writer 200 decides whether correspondence by the ordinary correspondence processing has failed based on the received response signal (Step T3). For example, the controller 240 implements incompleteness (data error) detection of data from the value of a CRC (Cyclic Redundancy Check) as an error detection code which is included in the data obtained by A/D converting the response signal.

When "correspondence failure" has been decided based on the detection result ("correspondence failure" in Step T3), the controller 240 outputs "abnormal end" (Step T4). On the other hand, when "correspondence success" has been decided based on the check result ("correspondence success" in Step T3), diagnostic processing by the following correspondence diagnosing unit is implemented. The decision of correspondence success/failure is not limited to the method using the CRC, but may be a decision based on inability of receiving a response signal (time-out) or based on an error response In the diagnostic processing, first, the controller 240 implements the noise diagnostic processing described later based on the noise amount that noise obtaining unit 244 has obtained in the ordinary correspondence processing (Step T5). As a result of the diagnosis, when the controller 240 has decided "NG" ("diagnosis NG" in Step T7), the controller 240 outputs "normal end (caution)." When the controller 240 has decided "OK" ("diagnosis OK" in Step T7), the controller 240 implements the S/N ratio diagnostic processing described later from the S/N ratio that the S/N ratio obtaining unit 245 has obtained (Step T9). As a result of the diagnosis, when the controller 240 has decided "NG" ("diagnosis NG" in Step T11), the controller 240 outputs "normal end (caution)" When the controller 240 has decided "OK" ("diagnosis OK" in Step T11), the controller 240 implements the reception power diagnostic processing described later from the reception power that reception-power obtaining unit 246 has obtained (Step T13). As a result of the diagnosis, when the controller 240 has decided "NG" ("diagnosis NG" in Step T15), the controller 240 outputs "normal end (caution)." When the controller 240 has decided "OK" ("diagnosis OK" in Step T15), the controller 240 implements the transmission power diagnostic processing described later from the transmission power that the transmission-power obtaining unit has obtained (Step T17). As a result of the diagnosis, when the controller 240 has decided "NG" ("diagnosis NG" in Step T19), the controller 240 outputs "normal end (caution)." When the controller 240 has decided "OK" ("diagnosis OK" in Step T19), the controller 240 outputs "normal end".

The above diagnosis result (normal end (caution) and normal end) indicates the correspondence margin. The normal end (caution) indicates lower correspondence margin than that of the normal end. The output is performed by the output controller 248 that transmits to the high-order device 100, or by the storage 270 that stores the diagnostic log 271, or by the display unit 280 that displays by display (LED lighting) or the like. When LED is used, abnormal end is displayed by lighting/flashing in "red color", normal end (caution) is displayed by lighting/flashing in "yellow color", and normal end is displayed by lighting/flashing in "green color". Therefore, the user can confirm the diagnosed correspondence margin, based on the display on the display 102 of the high-order device 100, or based on the display on the display unit 20, or based on the LED lighting, or based on the data read from the storage 270.

(Ordinary Correspondence Processing)

Figure 7:
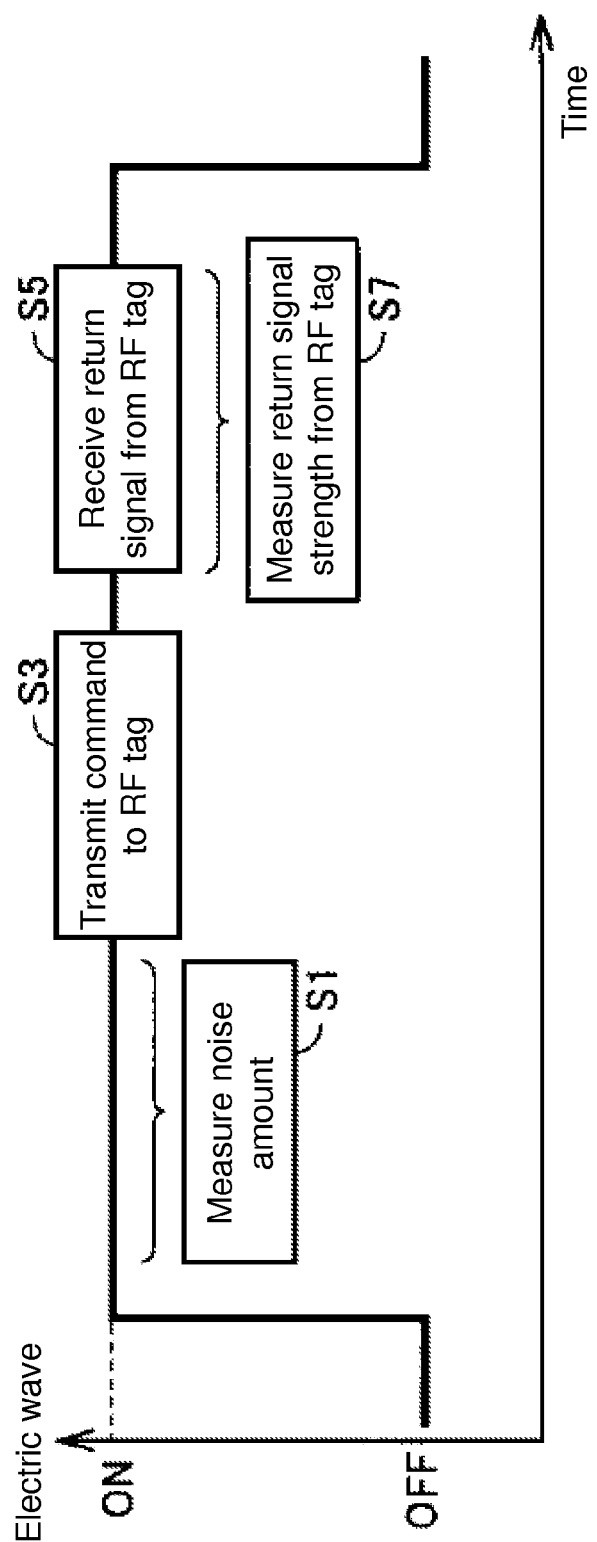
FIG. 7 is a diagram for explaining ordinary correspondence processing (Step T1) according to the first embodiment of the present invention.

FIG. 7 explains the ordinary correspondence processing (Step T1) according to the embodiment of the present invention. In FIG. 7, the vertical axis expresses the level of the electric wave of the transmission signal when oscillation has been implemented in predetermined maximum power. The lateral axis expresses elapsed time. In FIG. 7, first, the controller 240 controls oscillation circuit 250, and measures a noise amount when transmitting only a carrier signal that is not superposed with a transmission data signal such as a command from the transmission circuit 210 (Step S1).

Specifically, in the noise obtaining unit 244, the reception voltage/noise level measuring circuit 230 measures a noise amount (voltage) from the level of the signal extracted from the reception signal. At this time, the carrier is being normally output, and the level change of the reception signal when not corresponding with the RF tag 300 reflects surrounding noise. The reception voltage/noise level measuring circuit 230 operates to extract the level obtained when the reception signal has shifted to a higher level, so that the reception voltage/noise level measuring circuit 230 detects the level that reflects the size of noise (this is also referred as "noise level"). The reception voltage/noise level measuring circuit 230 executes at a few times the processing of sampling the detected noise level, calculates the average value of the sampling values, and stores the calculated average value in the storage 270. The calculated average value expresses the noise amount.

When the noise amount has been measured before correspondence with the RF tag 300 in this way, the controller 240 controls the transmission circuit 210 to transmit the command signal to the RF tag 300 (Step S3).

The controller 240 receives the response signal corresponding to the command signal from the RF tag 300 (Step S5), and the reception-power obtaining unit 246 measures the reception power (Step S7). Specifically, the controller 240 measures the reception power by using the voltage value indicated by the input signal from the reception voltage/noise level measuring circuit 230. The controller 240 calculates the average value of peak voltages of large amplitude portions of the reception signal generated by the change in the impedance at the RF tag 300 side, and stores the calculated average value of the peak voltages into the storage 270. In this case, the calculated voltage average value expresses the reception power. After the reception power has been measured, the ordinary correspondence processing ends.

(Noise Diagnostic Processing)

Figure 8:
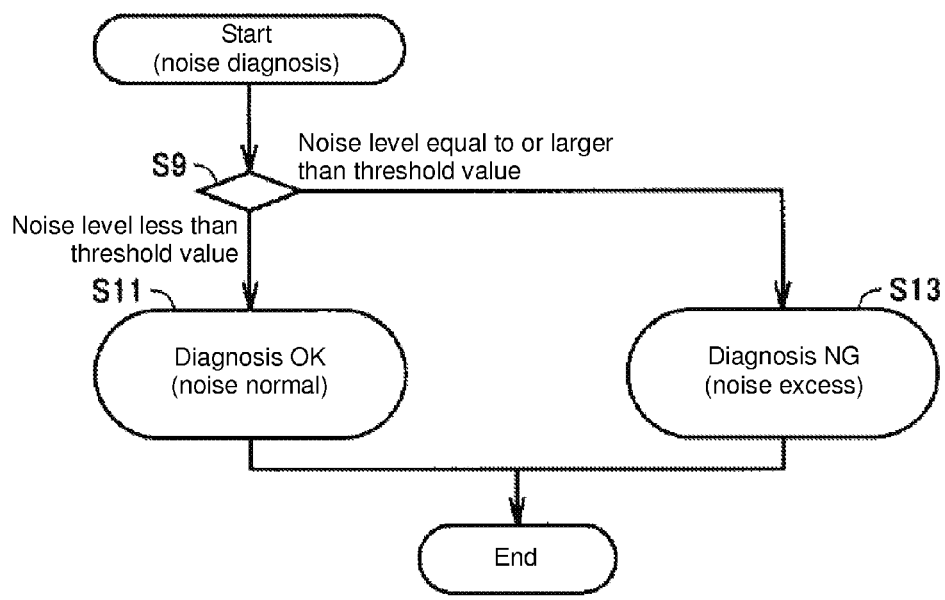
FIG. 8 is a flowchart of noise diagnostic processing according to the first embodiment of the present invention.

FIG. 8 is a flowchart of a noise diagnostic processing according to the embodiment of the present invention. When the noise diagnostic processing has been started, the correspondence diagnosing unit 242 compares between a measured noise amount and a predetermined threshold value, and decides whether a condition of (measured noise amount equal to or larger than threshold value) is established (Step S9). When the measured noise amount has been decided to be less than the threshold value from a condition expression ("noise level less than threshold value" in Step S9) the controller 240 outputs "diagnosis OK (noise normal)" (Step S11). When the measured noise amount has been decided to be equal to or larger than the threshold value from the condition expression ("equal to or larger than threshold value" in Step S9) the controller 240 outputs "diagnosis NG (noise excess)" (Step S13).

Figure 9:
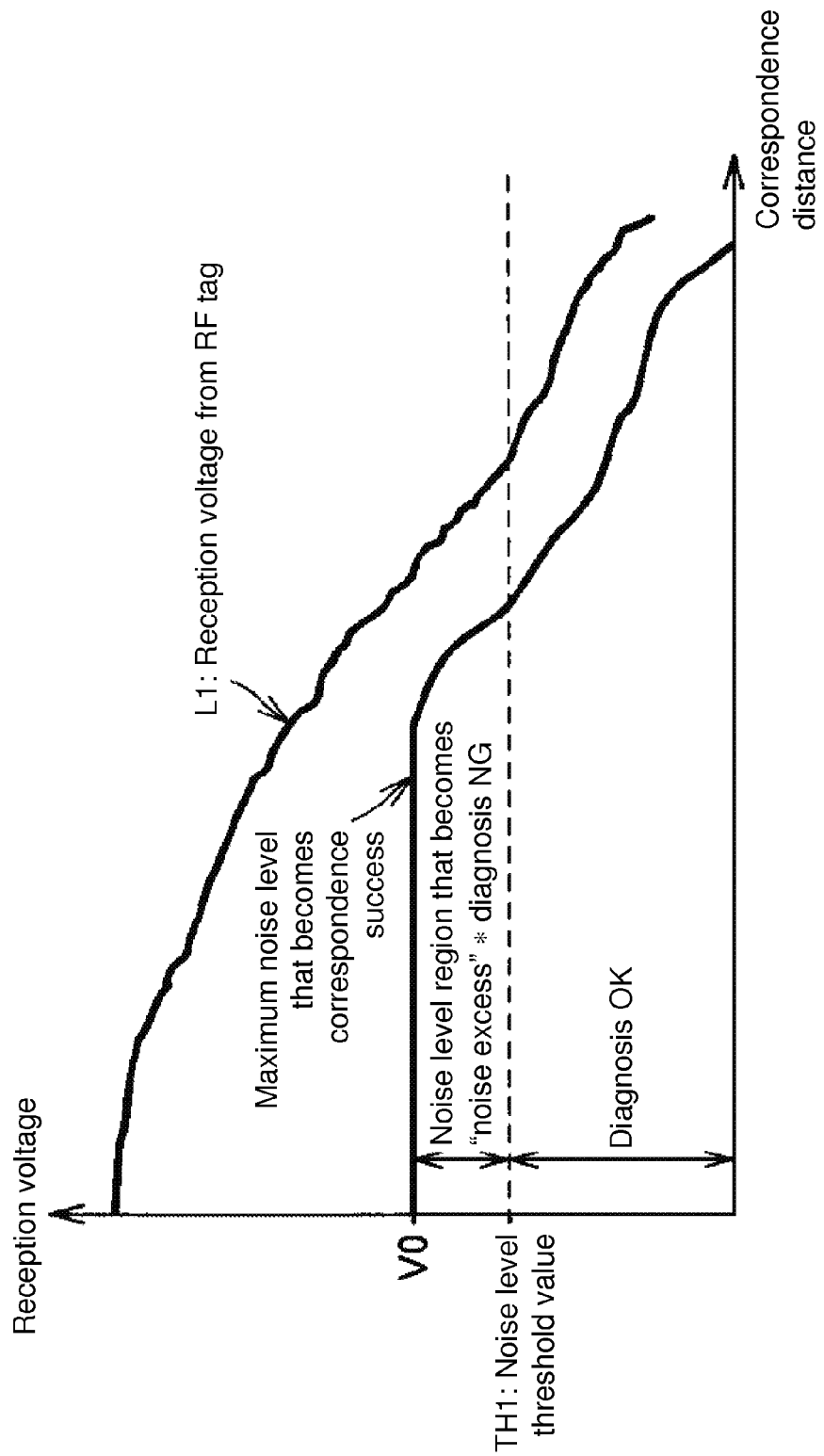
FIG. 9 is a graph for explaining the noise diagnostic processing according to the first embodiment of the present invention.

FIG. 9 is a graph for explaining the noise diagnostic processing according to the embodiment of the present invention. The graph is obtained by experiments. The vertical axis expresses the reception signal (reception voltage: unit V), and the lateral axis expresses the correspondence distance as a distance between the RFID reader/writer 200 and the RF tag 300. As illustrated in FIG. 9, when the correspondence distance becomes larger, a reception voltage L1 indicated by the reception signal from the RF tag 300 becomes lower. In the embodiment, when a maximum noise-level value V0 that is decided as correspondence success in Step T3 has been set, a noise level threshold value TH1 having predetermined margin from the value V0 is set. Therefore, when the reception voltage has been decided to be in the range from a threshold value TH1 to maximum noise level V0 ("noise level equal to or larger than threshold value in Step S9), the controller 240 outputs "diagnosis NG (noise excess)". When the reception voltage has been decided to be less than the threshold value TH1, the controller 240 outputs "diagnosis OK".

Therefore, when "diagnosis OK" has been output, it is possible to output that correspondence margin concerning the peripheral noise amount is high. When "diagnosis NG (noise excess)" has been output due to a using environment of much noise, for example, it is possible to output that correspondence margin is low although correspondence is successful.

(S/N Ratio Diagnostic Processing)

Figure 10:
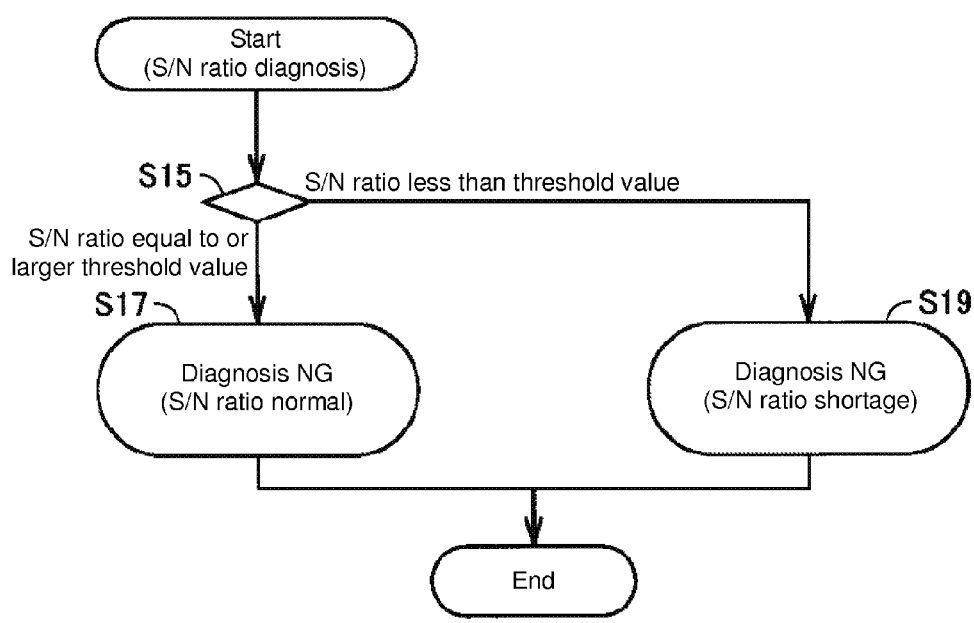
FIG. 10 is a flowchart of S/N ratio (Signal-to-Noise ratio) diagnostic processing according to the first embodiment of the present invention.

FIG. 10 is a flowchart of an S/N ratio (Signal-to-Noise ratio) diagnostic processing according to the embodiment of the present invention. In this case, "S" expresses the reception signal (reception voltage) measured in Step S7, and "N" expresses the surrounding noise amount (voltage) measured in Step S1.

When the processing has been started, the S/N ratio obtaining unit 245 calculates the S/N ratio based on the measured value. The correspondence diagnosing unit 242 compares the calculated value of the S/N ratio and the predetermined threshold value, and decides whether the condition of (S/N ratio equal to or larger than threshold value) is established (Step S15). When it has been decided that the condition has been established ("S/N ratio equal to or larger than threshold value" in S15), the correspondence diagnosing unit 242 outputs "diagnosis OK (S/N ratio normal)" (Step S17). On the other hand, when it has been decided that the condition has not been established ("less than S/N ratio threshold value" in S15), the correspondence diagnosing unit 242 outputs "diagnosis NG (S/N ratio shortage)" (Step S19).

Figure 11:
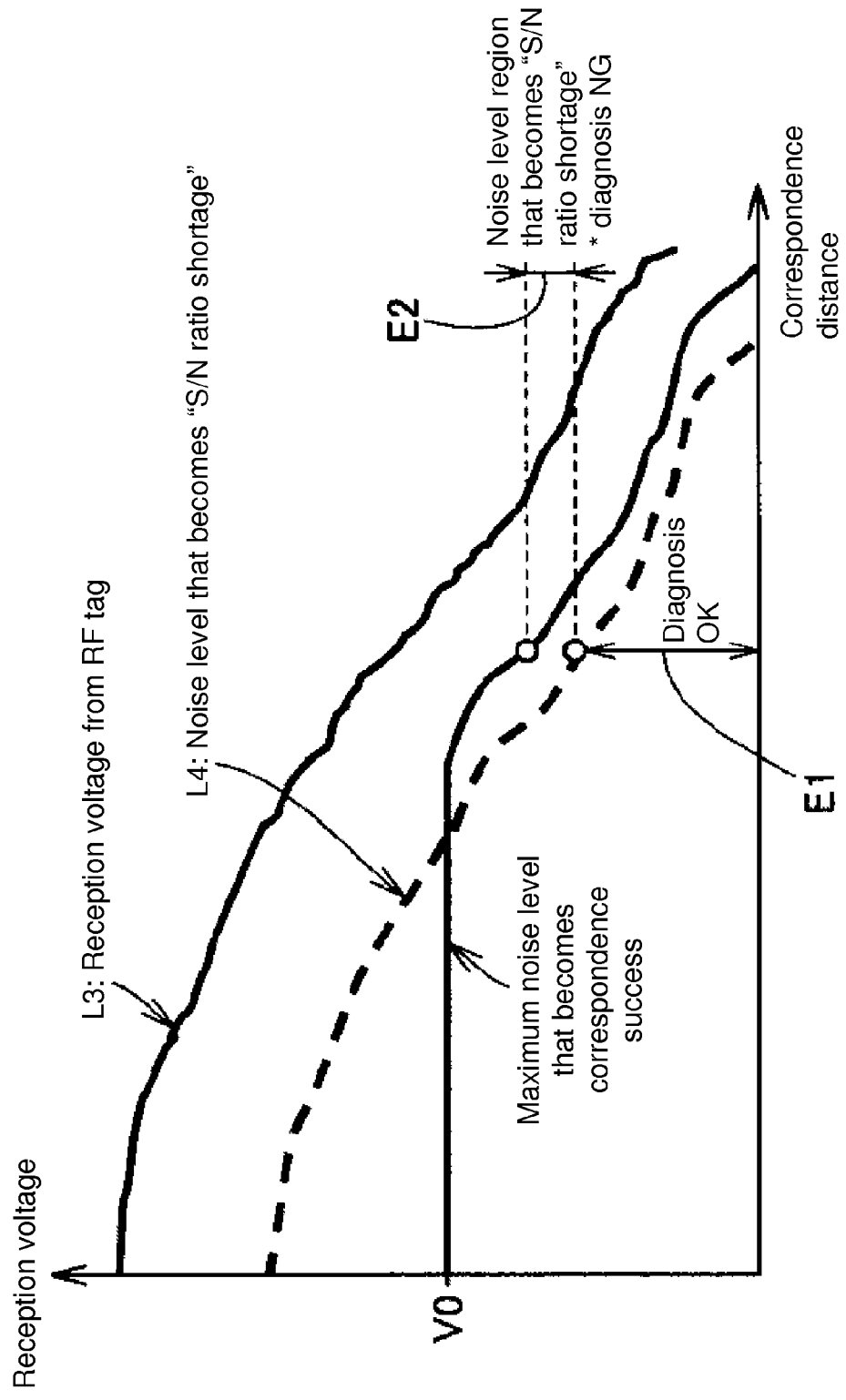
FIG. 11 is a graph for explaining the S/N ratio diagnostic processing according to the first embodiment of the present invention.

FIG. 11 is a graph for explaining the S/N ratio diagnostic processing according to the embodiment of the present invention. The graph is obtained by experiments, and the vertical axis expresses the voltage of the reception signal from the RF tag 300, and the lateral axis expresses the correspondence distance. FIG. 11 illustrates a graph of a reception voltage L3 indicated by the reception signal from the RF tag 300, and a graph L4 that shows a change in the noise level that becomes the S/N ratio shortage. In FIG. 11, a region E2 calculated from the noise amount that indicates the predetermined margin from the maximum noise-level value V0 is used as the threshold value in Step S15. Therefore, when the S/N ratio corresponding to the region E1 that indicates the S/N ratio less than the region E2 has been measured, "diagnosis OK (S/N ratio normal)" is output in Step S19. When the S/N ratio corresponding to the region E2 has been measured, "diagnosis NG (S/N ratio shortage)" is output.

Therefore, when "diagnosis OK" has been output, it is possible to output that correspondence margin concerning the S/N ratio is high. When "diagnosis NG (S/N ratio shortage)" has been output due to the using environment of much noise amount, for example, it is possible to output that correspondence margin is low although correspondence is successful.

(Reception Power Diagnostic Processing)

Figure 12:
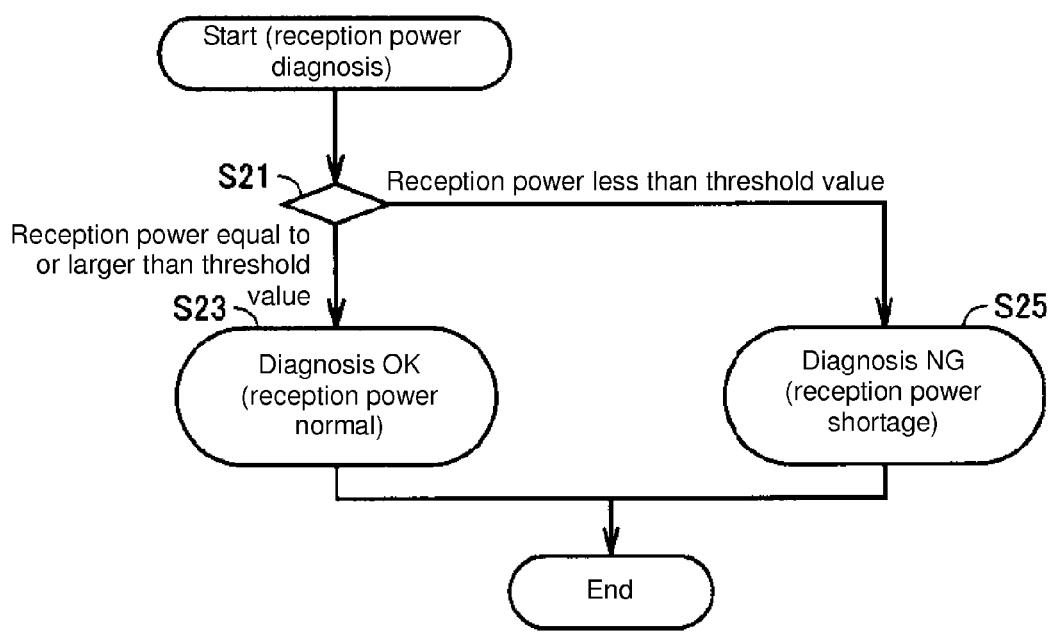
FIG. 12 is a flowchart of reception power diagnostic processing according to the first embodiment of the present invention.

FIG. 12 is a flowchart of a reception power diagnostic processing according to the embodiment of the present invention. When the reception power diagnostic processing has been started, the correspondence diagnosing unit 242 compares the reception power obtained at the reception time in Step S5 and the predetermined threshold value, and decides whether the condition of (reception power equal to or larger than threshold value) is established (Step S21). When it has been decided that the reception power is equal to or larger than the threshold value from the condition expression ("reception power equal to or larger than threshold value" in Step S21), the correspondence diagnosing unit 242 outputs "diagnosis OK (reception power normal)" (Step S23). However, when it has been decided that the reception power is less than the threshold value from the condition expression ("noise level less than threshold value" in Step S21), the correspondence diagnosing unit 242 outputs "diagnosis NG (reception power shortage)" (Step S25).

Figure 13:
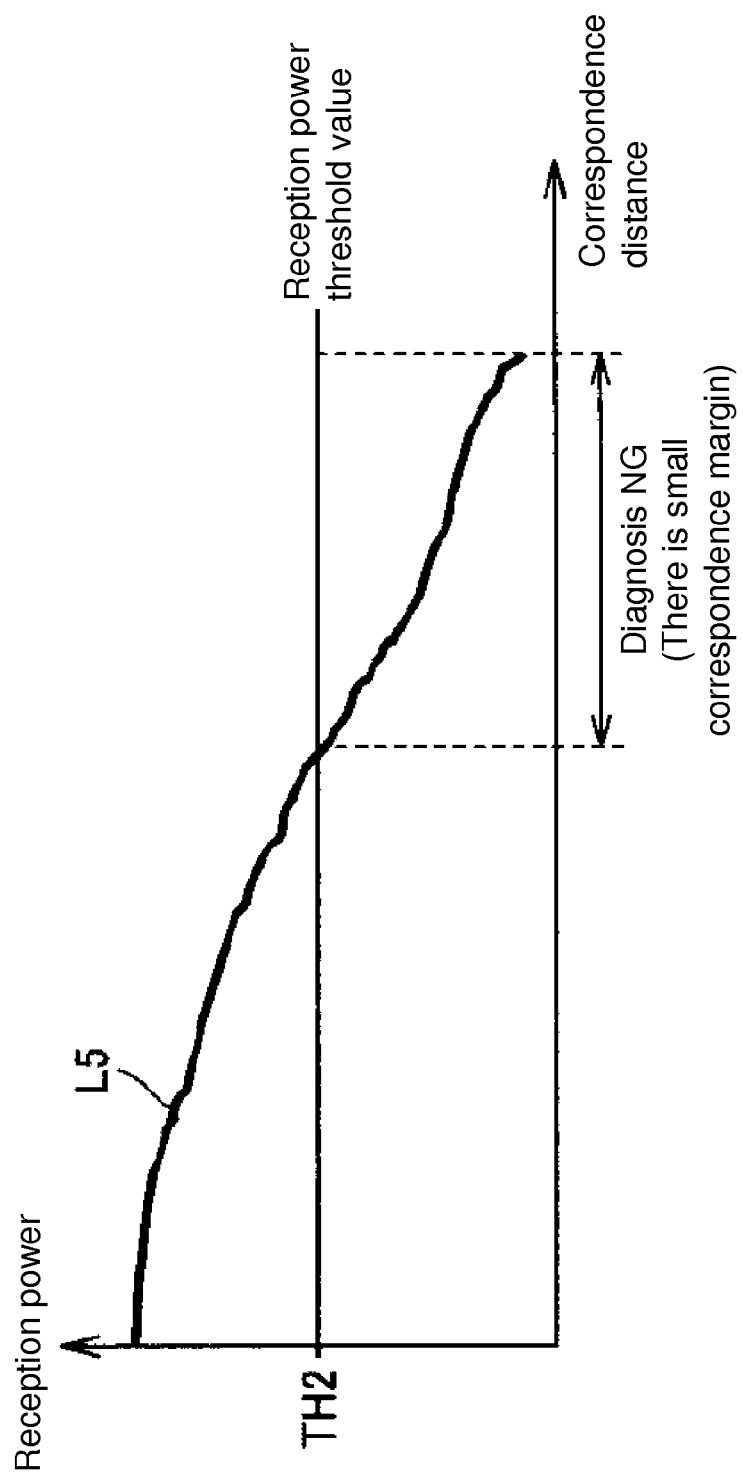
FIG. 13 is a graph for explaining the reception power diagnostic processing according to the first embodiment of the present invention.

FIG. 13 is a graph for explaining the reception power diagnostic processing according to the embodiment of the present invention. The vertical axis expresses reception power of the reception signal from the RF tag 300, and the lateral axis expresses the correspondence distance. FIG. 13 also illustrates a graph L5 of the reception power obtained by experiments. When a predetermined threshold value TH2 for deciding the reception power has been set, for example, when the correspondence distance has become long and the reception power has become less than the threshold value TH2 in Step S21, "reception power less than threshold value TH2" is decided and the controller 240 outputs "diagnosis NG (reception power shortage)". When the correspondence distance is short and "reception power equal to or larger than threshold value TH2" has been decided in Step S21, the controller 240 outputs diagnosis OK (reception power normal)".

Therefore, when "diagnosis OK" has been output, it is possible to output that correspondence margin concerning reception power is high. When "diagnosis NG (reception power shortage)" has been output, it is possible to output that correspondence margin concerning reception power is low although correspondence is successful.

The threshold value of each diagnostic processing is obtained by experiments and the like, and is stored beforehand in the storage 270. The setting of the threshold value can be changed.

In the above diagnostic processing, although the decision has been made in two stages of "normal" and "caution", the decision may be also implemented in three or more stages by providing a plurality of threshold values.

(Transmission Power Diagnostic Processing)

In each diagnostic processing described above, correspondence margin has been decided based on a predetermined standard (each threshold value described above), from characteristic values (noise amount, S/N ratio, and reception power) obtained from the correspondence signal, particularly, the reception signal. On the other hand, in the transmission power diagnostic processing, the standard expresses whether reception of a response signal from the RF tag 300 is successful when transmission has been performed in predetermined transmission power.

Figure 14:
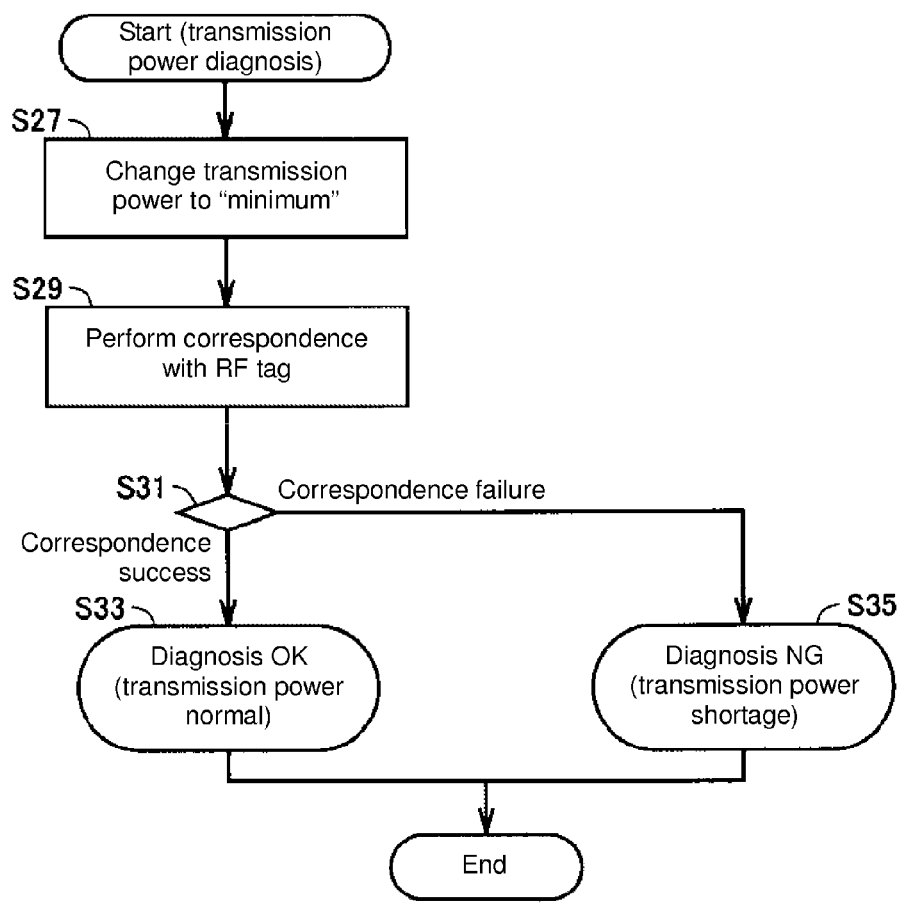
FIG. 14 is a flowchart of transmission power diagnostic processing according to the first embodiment of the present invention.

FIG. 14 is a flowchart of a transmission power diagnostic processing according to the embodiment of the present invention. At the ordinary correspondence time (Step S3), transmission power has been set to "maximum". After the transmission power diagnostic processing has been started, the correspondence diagnosing unit 242 transmits a carrier signal by changing the transmission power to "minimum" that indicates weak transmission power in which it is possible to decide that the RFID reader/writer 200 can stably perform correspondence (Step S27). Thereafter, the RFID reader/writer 200 performs correspondence by transmitting data to the RF tag 300 (Step S29). The control unit 240 decides "correspondence success" in Step S31 when a response signal (including an error signal) from the RF tag 300 has been successfully received, and outputs "diagnosis OK (transmission power normal)" (Step S33). On the other hand when the response signal has not been able to be received, the controller 240 decides "correspondence failure" in Step S31, and outputs "diagnosis NG (transmission power shortage)" (Step S35).

Figure 15:
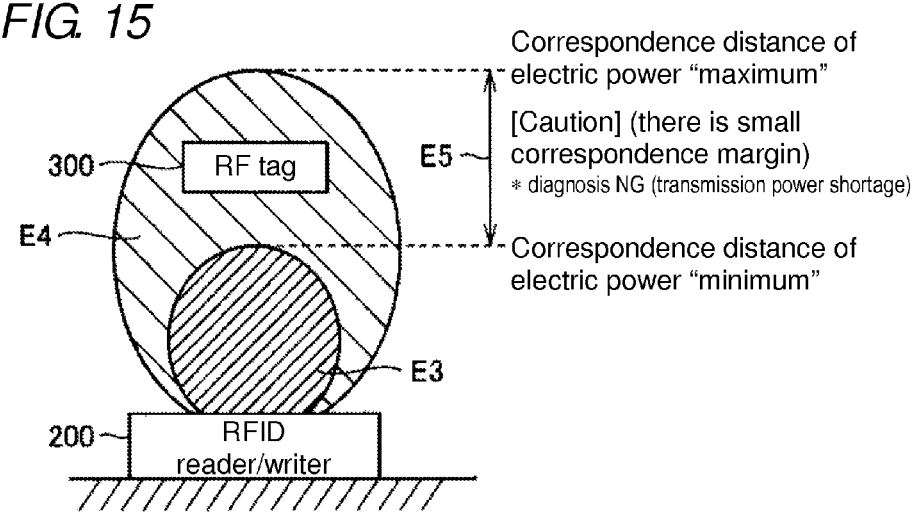
FIG. 15 schematically illustrates a relationship between transmission power and a correspondence distance according to the first embodiment of the present invention.

FIG. 15 schematically illustrates a relationship between transmission power and a correspondence distance according to the embodiment of the present invention. FIG. 15 illustrates that the RF tag 300 is positioned in a direction to which an electric wave is radiated from the RFID reader/writer 200 (more specifically antenna coil 211). When performing correspondence in minimum power as weak transmission power, the controller 240 decides "correspondence success" when the RF tag 300 is positioned in region E3. When performing correspondence in transmission power maximum, it is decided that correspondence with the RF tag 300 that is positioned in a region E4 including a region E3 is correspondence success. When the RF tag 300 is positioned in a region E5 from minimum to maximum as weak transmission power, the controller 240 decides "diagnosis NG (transmission power shortage)" in the transmission power diagnostic processing.

Therefore, when "diagnosis OK" has been output, it is possible to output that correspondence margin concerning transmission power is high. When "diagnosis NG (transmission power shortage)" has been output, it is possible to output that correspondence margin concerning transmission power is low although correspondence is successful.

(Modification of Transmission Power Diagnostic Processing)

A modification of the transmission power diagnostic processing will be described with reference to FIG. 16 and FIG. 17. In the above transmission power diagnostic processing, diagnosis has been performed by dividing transmission power into two stages of minimum and maximum by adjusting the power supply voltage for oscillation. In the modification, diagnosis will be performed by dividing transmission power into three stages to perform the diagnosis in further detail.

Figure 16:
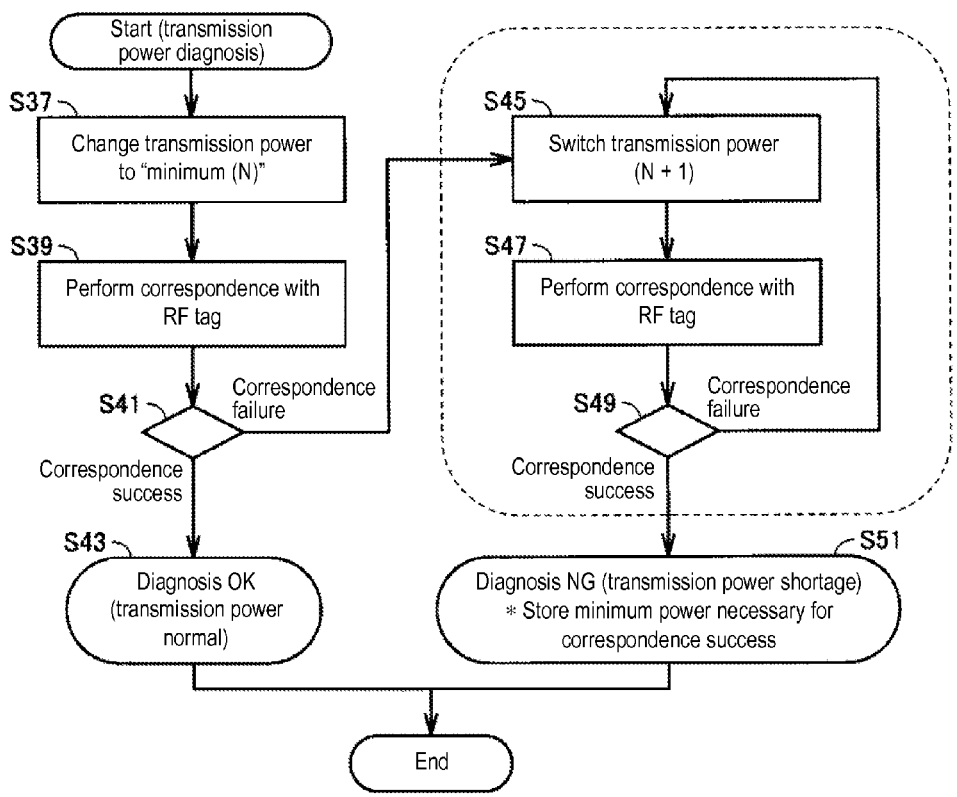
FIG. 16 is other flowchart of transmission power diagnostic processing according to the first embodiment of the present invention.

FIG. 16 is other flowchart of a transmission power diagnostic processing according to the embodiment of the present invention. FIG. 17 illustrates a table TB that is referred to for switching transmission power in stages. The table TB is stored in advance in the storage 270, and data obtained by classifying transmission power into ten stages from minimum (N) to maximum (N+9) has been registered in the table TB.

In FIG. 16, first, the correspondence diagnosing unit 242 searches the table TB, changes the transmission power to "minimum (N)", starts oscillation of a carrier signal (Step S37), and performs correspondence with the RF tag 300 (Step S39).

The correspondence diagnosing unit 242 decides correspondence success/failure based on the response signal from the RF tag 300 (Step S41). When the correspondence diagnosing unit 242 has decided "failure" ("correspondence failure" in Step S41), the process proceeds to Step S45. When the correspondence diagnosing unit 242 has decided "success" ("correspondence success" in Step S41), the control unit 240 outputs "diagnosis OK (transmission power normal)" (Step S43).

In Step S45, the correspondence diagnosing unit 242 reads data "N+1" registered in the next order in the table TB, switches transmission power to transmission power which is indicated by the read value, and oscillates (Step S45). Based on the switched transmission power, the correspondence diagnosing unit 242 corresponds data with the RF tag 300 (Step S47). The correspondence diagnosing unit 242 decides correspondence success/failure based on the response signal received in the correspondence based on switched transmission power (Step S49). When "failure" in correspondence has been decided ("correspondence failure" in Step S49), the process returns to Step S45.

In Step S45, the correspondence diagnosing unit 242 reads next-order data "N+2" registered in the table TB, switches transmission power to transmission power which is indicated by the read value, and oscillates (Step S45). Thereafter, the processing in Steps S47 and S49 is similarly executed. During the period when "correspondence failure" is decided, transmission power is switched to transmission power indicated by the next-order data that is read from the table TB. That is, correspondence is implemented by switching the transmission power to gradually larger transmission power, and consequently, transmission power that can be decided as correspondence success can be detected. In the present example, to simplify the description, it is assumed that correspondence success is decided in any one value in the table TB.

When "success" has been decided ("correspondence success" in Step S49), "diagnosis NG (transmission power shortage)" is output, and also minimum electric power necessary for correspondence success, that is, the value of N read from table TB immediately before, is stored in the storage 270 (Step S51). Therefore, based on the execution of the processing in Steps S45, S47, and S49, data that indicates a minimum transmission power value which is decided as "correspondence success" can be detected and stored.

Figure 17:
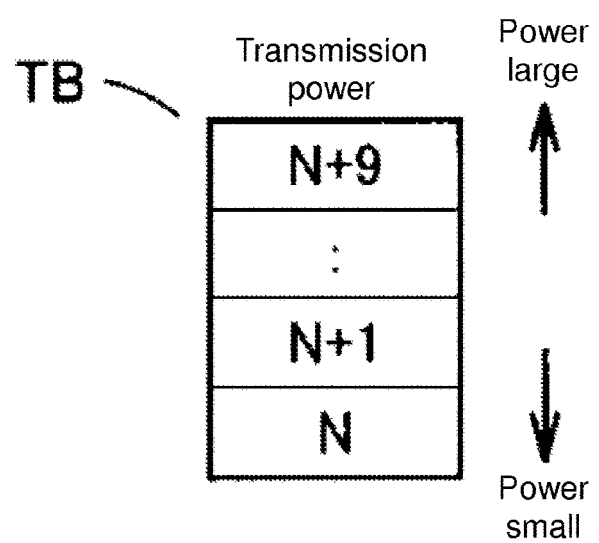
FIG. 17 illustrates a table TB that is referred to for switching transmission power in stages according to the first embodiment of the present invention.

Although data obtained by classifying the transmission power into ten stages has been registered in the table TB in FIG. 17, a classification number is not limited to ten stages. In the modification, because the classification number is relatively small of ten, the controller 240 searches the table TB by a sequential searching method, a binary searching method may be also employed. When the classification number is large, employment of the binary searching method makes it possible to quickly reach minimum electric power (the value of N) that is decided as "correspondence success", as compared with the sequential searching method.

(Validation/Nullification of Correspondence Diagnostic Function)

Each flowchart of the above diagnostic processing is stored as a program in the storage 270 in advance. The correspondence diagnostic processing is realized when the CPU 241 reads the program from the storage 270 and executes the program. In the embodiment, it is possible to switch permission/prohibition of the execution of the program. Specifically, the RFID reader/writer 200 executes the program when the RFID reader/writer 200 has received a permission instruction from the high-order device 100 (validation setting), and does not execute the program when the RFID reader/writer 200 has received a prohibit instruction (nullification setting).

When the RFID reader/writer 200 to which "correspondence diagnostic function" has been nullification set receives the instruction from the high-order device 100 to perform correspondence with the RF tag 300, the RFID reader/writer 200 performs a (general) RFID wireless correspondence processing, and returns a response of normal/abnormal based on the response signal to the high-order device 100. Further, the RFID reader/writer 200 notifies normal/abnormal by operation display light (LED).

Specifically, at the normal time, the RFID reader/writer 200 returns to the high-order device 100, the code (normality code) indicating the normal completion of the correspondence processing. When the instruction received from the high-order device 100 has been "read instruction", the RFID reader/writer 200 returns the normality code and the data read from the RF tag 300 together, to the high-order device 100. A color (green color or the like) that expresses "normal" is lit on the operation display light. At the abnormal time, the RFID reader/writer 200 decides the abnormal content, and returns the abnormality code (the RF tag 300 absence error, correspondence error, and the like to the high-order device 100. A color (red color or the like) that expresses "abnormal" is lit on the operation display light.

When the RFID reader/writer 200 to which "correspondence diagnostic function" has been validation set receives the instruction from the high-order device 100 to perform correspondence with the RF tag 300, the RFID reader/writer 200 simultaneously executes the (general) RFID wireless correspondence processing and the above" correspondence diagnosis" processing. Then, the RFID reader/writer 200 returns to the high-order device 100, a response that expresses the result by any one of normal, caution, and abnormal. Further, normal, caution, and abnormal are notified by lighting the operation display light (LED) of the display unit 280.

Specifically, at the normal time, the RFID reader/writer 200 returns to the high-order device 100, the code (normality code) indicating the normal completion of the correspondence processing. When the instruction received from the high-order device 100 has been "read instruction", the RFID reader/writer 200 returns the normality code and the data read from the RF tag 300 together, to the high-order device 100. A color (green color or the like) that expresses "normal" is lit on the operation display light.

At the caution time, the RFID reader/writer 200 returns to the high-order device 100, the code (caution code) that expresses reduction in "correspondence margin" although the correspondence processing has been normally completed. When the instruction received from the high-order device 100 has been "read instruction", the RFID reader/writer 200 returns the normality code and the data read from the RF tag 300 together, to the high-order device 100. A color (yellow color or the like) that expresses "caution" is lit on the operation display light.

At the abnormal time, the RFID reader/writer 200 returns to the high-order device 100, message content MTB corresponding to the abnormality code (notification item MTA, the RF tag 300 absence error, correspondence error, and the like in a table MT described later) that expresses the diagnosis result indicating the abnormal content. A color (red color or the like) that expresses "abnormal" is lit on the operation display light.

(Order of Correspondence Diagnostic Processing)

According to the flowchart in FIG. 6, noise diagnosis, S/N ratio diagnosis, reception power diagnosis, and transmission power diagnosis have been implemented in this order. However, the implementation order is not limited to this order, and may be variable. When the user has transmitted the instruction of order setting to the RFID reader/writer 200 by operating the high-order device 100, the CPU 241 changes the execution order of each diagnosis based on the reception instruction. The user may execute all the diagnostic processing illustrated in FIG. 6, obtain the result of the execution (diagnosis result of each diagnostic processing), and output the execution result. The user can also transmit to the RFID reader/writer 200, the instruction for executing all kinds of diagnostic processing by operating the high-order device 100. The user can also transmit to the RFID reader/writer 200, the instruction for executing selectively assigned one or more kinds of diagnostic processing. The CPU 241 executes all the diagnostic processing or selectively assigned one or more kinds of diagnostic processing, based on the instruction received from the high-order device 100.

Second Embodiment

In the embodiment, there will be described the case of displaying by the display device the information of a diagnostic log 271 which has been obtained by having the information stored in a storage 270 by the above correspondence diagnostic processing.

Figure 18:
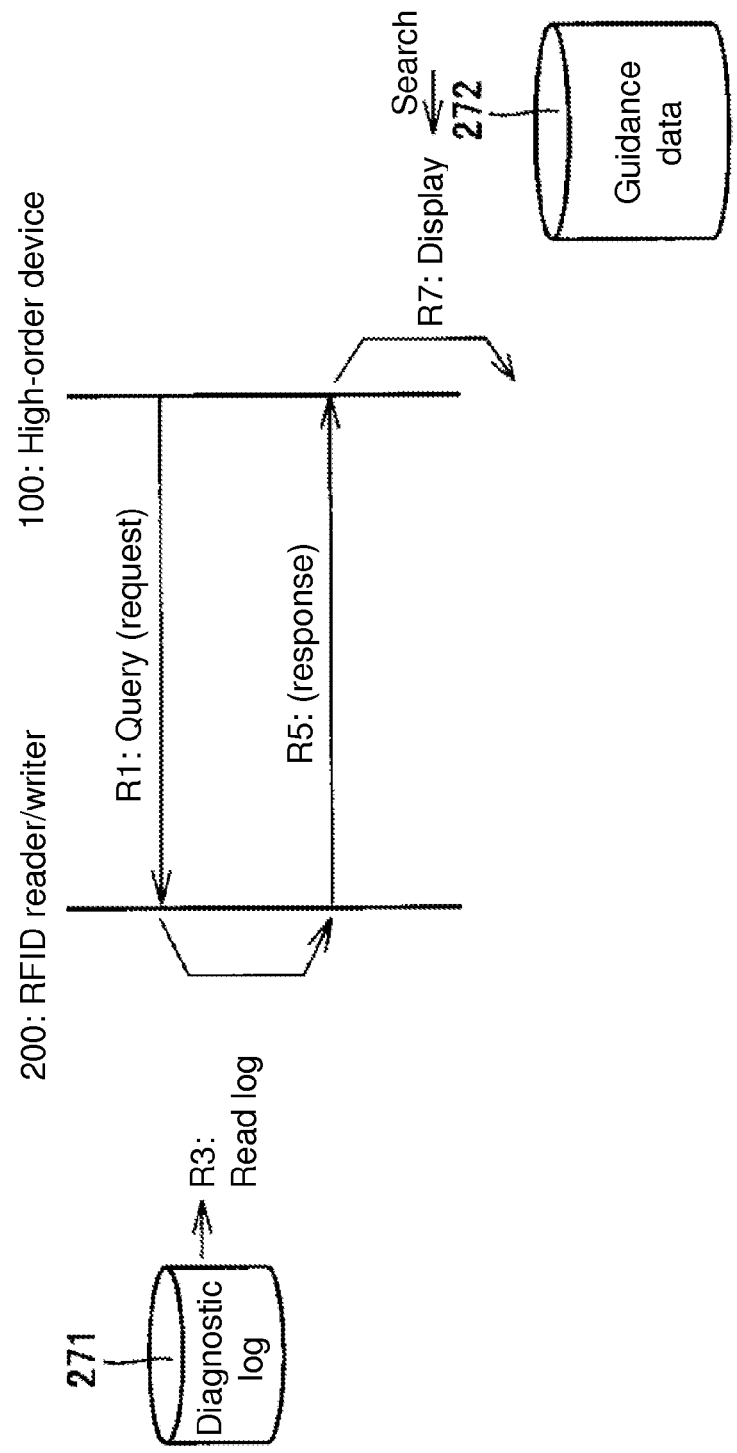
FIG. 18 is a communication sequence diagram according to a second embodiment of the present invention.

FIG. 18 is a communication sequence diagram according to a second embodiment of the present invention. In the embodiment, an HTTP (Hyper Text Transfer Protocol) function is installed in an RFID reader/writer 200. A web browser function is installed in the high-order device 100. In FIG. 18, the user operates the high-order device 100 to connect to the RFID reader/writer 200 from the web browser function, and transmits a query (request) (Step R1). Then, in the RFID reader/writer 200, a controller 240 reads the information read from a diagnostic log 271, in response to the received query (Step R3), and returns the read information as a response (Step R5). The high-order device 100 obtains the diagnostic log 271 by reception, and displays the image in a display 102, based on the obtained information (Step R7). At the display time, guidance data 272 is searched. Based on the search result, the image is generated by the image display processing program that is executed by a CPU 110.

The CPU 110 outputs a drive signal to a display controller (liquid crystal controller or the like) 120, based on the generated image data. The display controller 120 controls the display 102 following the drive signal. The image is displayed in the display 102, by the display controller such as the display controller 120.

(Configuration of Diagnostic Log)

Figure 19:
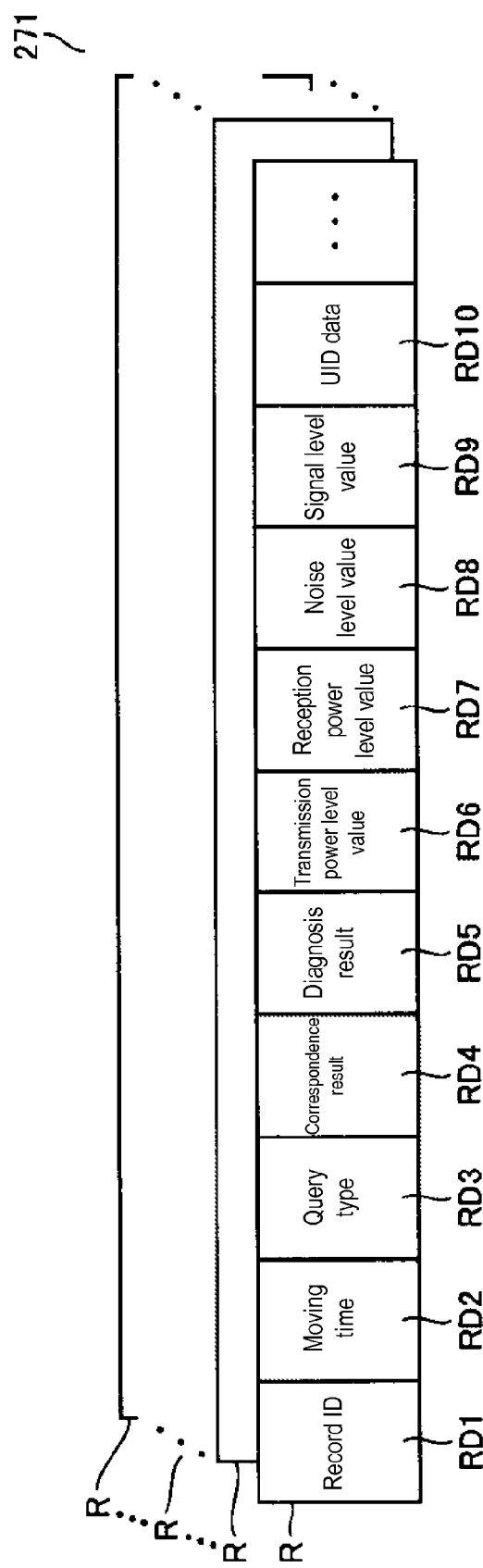
FIG. 19 illustrates a content example of diagnostic log 271 according to the second embodiment of the present invention.

FIG. 19 illustrates a content example of the diagnostic log 271 according to the embodiment. The diagnostic log 271 includes at least one record R. An output controller 248 registers in the diagnostic log 271, record R by generating record R that stores the diagnosis result, each time when a diagnostic processing result has been output by the processing in FIG. 6.

Record R includes record ID (Identifier) RD1 for identifying the record, working time RD2 that expresses time measured by the timer not shown which expresses time taken to execute the correspondence diagnosis, and query type RD3 as a command received from the high-order device 100 at the correspondence diagnosis time. Further, record R includes correspondence result RD4 based on the command, diagnosis result RD5 that expresses correspondence margin, transmission power level value RD6 that the transmission-power obtaining unit has obtained at the correspondence diagnosis time, reception power level value RD7 that a reception-power obtaining unit 246 has obtained at the correspondence diagnosis time, and noise level value RD8, signal level value RD9, and UID data RD10 that a noise obtaining unit 244 has obtained at the correspondence diagnosis time. In the present example, the working time RD2 also expresses time taken by the RF tag 300 to execute the corresponding command.

FIG. 20 illustrates an example of the content of the query type RD3, the correspondence result RD4, and the diagnosis result RD5 illustrated in FIG. 19.

The transmission power level value RD6, the reception power level value RD7, the noise level value RD8, and the signal level value RD9 express values obtained by converting the measured levels to values from 0 to 10. The UID data RD10 expresses the identifier of the RF tag 300 identified at the correspondence time. The signal level value expresses the value obtained by calculating (transmission power level value+reception power level value)/2

Although data has been stored above in the record R format, when the data obtained in each diagnosis can be related to each other, the storage format is not limited to the method of using the record.

(Exemplification of Advice or Guidance Information)

FIG. 21 explains a table MT according to the embodiment of the present invention. In the table MT, there are registered in advance notification item MTA which is the result of the above correspondence diagnostic processing, and message content MTB corresponding to each notification item. The message content MTB includes details of the diagnosis result, and advice or guidance information of measure items for enabling a stable correspondence operation by enhancing correspondence margin when "caution" has been output by diagnosis. The measure items include adjustment of a correspondence distance, removal of a noise source, and the like.

In FIG. 21, notification item MTA includes transmission power shortage (Steps S35 and S51), reception power shortage (Step S25), S/N ratio shortage (Step S19), and noise excess (Step S13).

(Screen Display Example of List)

Figure 22:
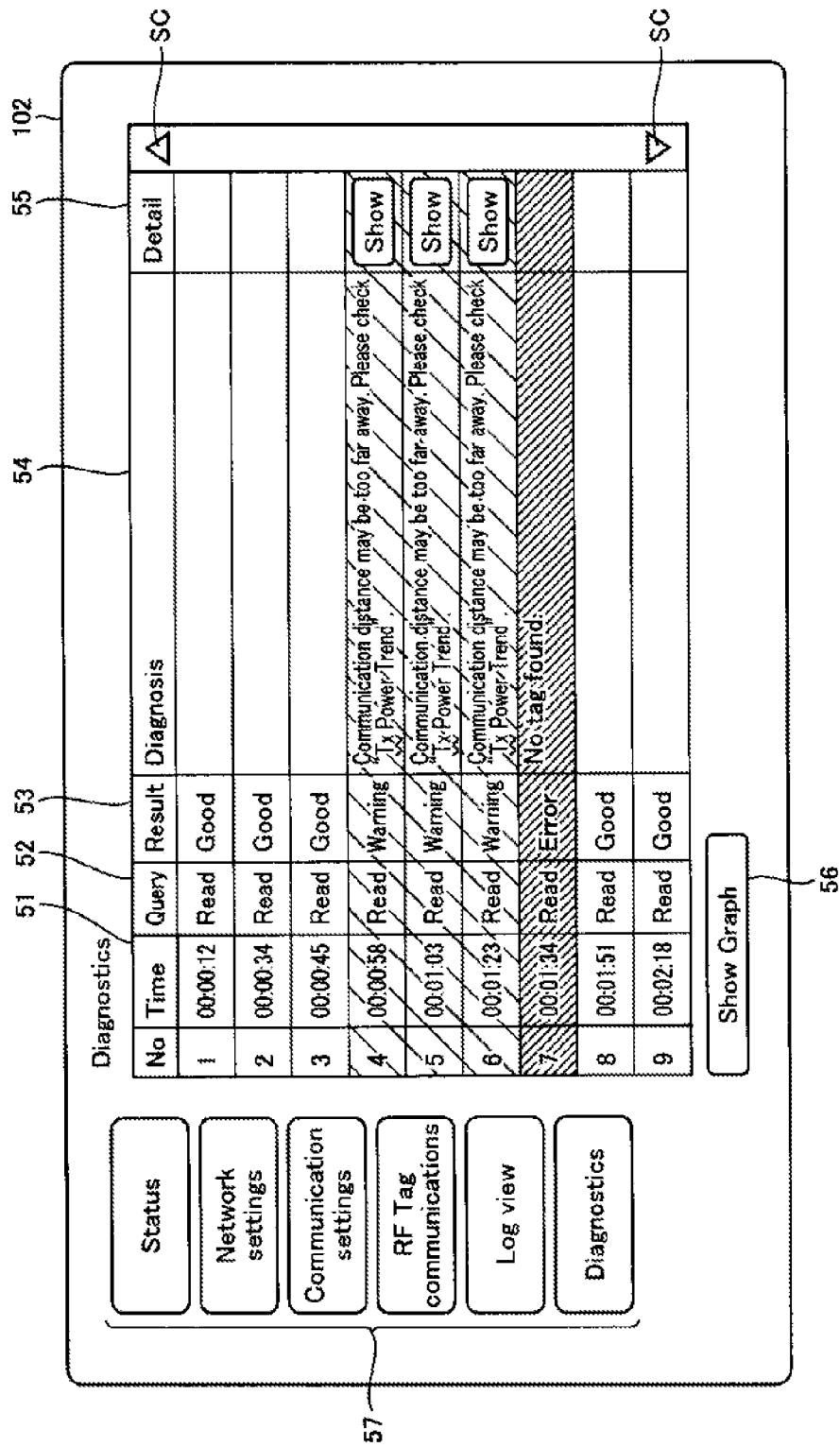
FIG. 22 illustrates a display screen example of a list according to the second embodiment of the present invention.

FIG. 22 illustrates a display screen example of a list according to the embodiment. The CPU 110 displays the result of correspondence diagnosis by list in the table format, as shown in FIG. 21, based on the received diagnostic log 271.

The CPU 110 displays the information of record R of the received diagnostic log 271, in the table format, following the ascending order of record IDRD1 or the working time RD2. In the table, working time 51 at the command execution time indicated by the working time RD2, executed command type 52 indicated by the query type RD3, a correspondence diagnosis result 53 indicated by the diagnosis result RD5, an advice 54 based on the diagnosis result RD5, and a button 55 are displayed in relation to each other. The button 55 is the image such as an icon which is operated to display the screen that shows detailed information of corresponding the advice 54. The table also includes a scroll button SC that is operated to scroll-display the list.

The advice 54 is obtained from the guidance data 272. Specifically, the guidance data 272 stores advice of the measure items for enhancing margin of correspondence, corresponding to each value (see the column of "content" in FIG. 20) shown in the correspondence diagnosis result 53. The CPU 110 searches the guidance data 272 for enhancing correspondence margin, based on the value of the correspondence diagnosis result 53, reads the advice related to the search result and the correspondence diagnosis result, and displays the read result by relating to the correspondence margin.

Further, in the screen in FIG. 22, a correspondence margin is displayed in different modes according to a level of the correspondence margin. Specifically, the background color of the information of record R is changed by respectively relating to "normal", "caution", and "abnormal" in the diagnosis result RD5. For example, caution is attracted by displaying the background in no color for "normal" (there is sufficient correspondence margin), by displaying the background in "yellow color" for "caution" (correspondence margin is small), and by displaying the background in "red color" for "abnormal" (abnormality occurs at the correspondence time), respectively.

The screen also includes a switch button 57 of display mode, and the button 56 that is operated to switch the screen to a screen that displays the correspondence diagnosis result in the numerical value by graph.

(Screen Display Example of Bar Graph)

Figure 23:
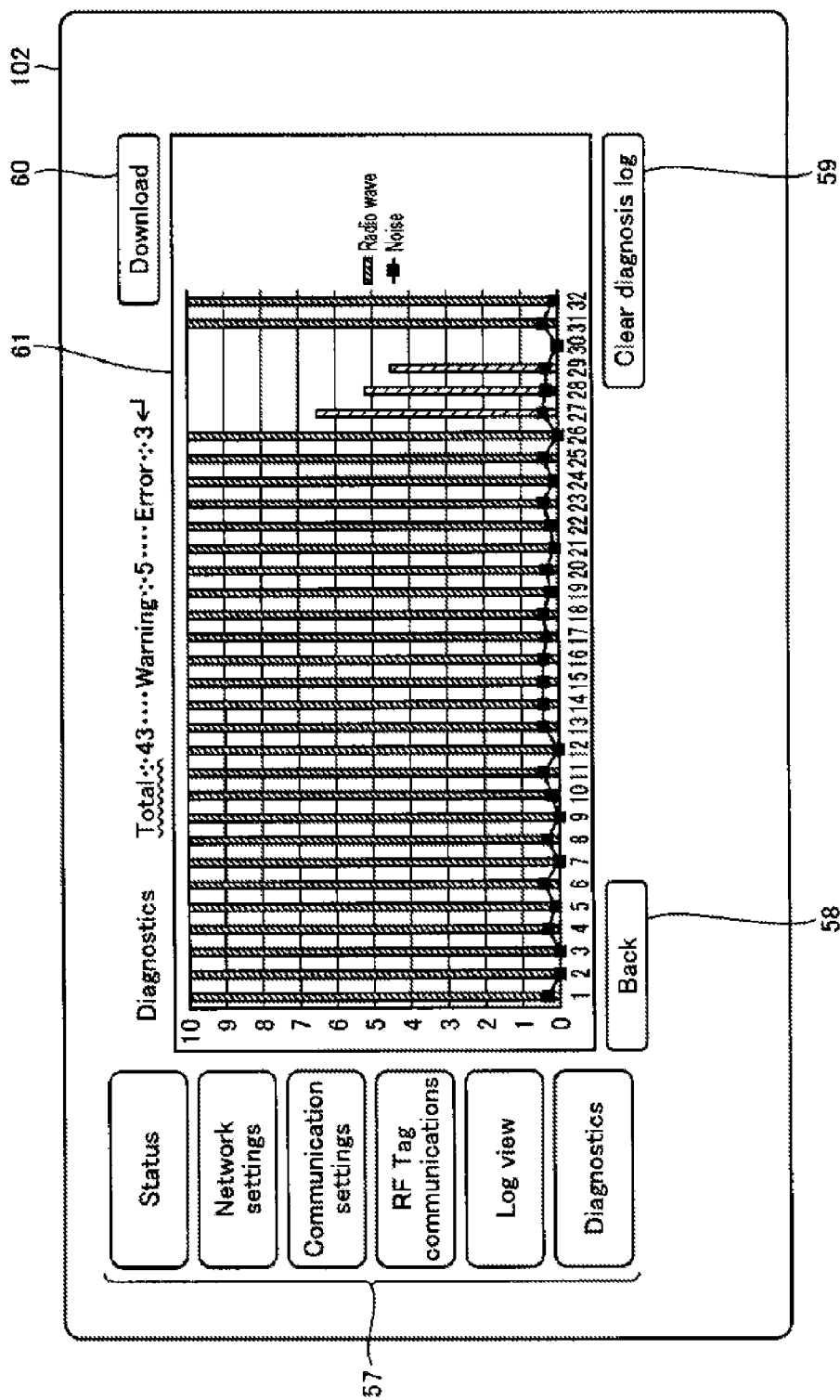
FIG. 23 illustrates a display screen example of a bar graph according to the second embodiment of the present invention.

FIG. 23 illustrates a display screen example of a bar graph according to the embodiment. When the button 56 on the display screen in FIG. 22 has been operated, the screen is switched to the screen in FIG. 23.

FIG. 23 illustrates a screen image of a graph display that expresses the correspondence diagnosis result in numerals. This screen includes switch the button 57 of a display mode, a button 58 to be operated to switch to the preceding screen (the screen in FIG. 21), a button 59 to be operated to initialize (clear) the diagnostic log 271 at the RFID reader/writer 200 side, and a button 60 to be operated to instruct download of the diagnostic log 271.

In a region 61 in FIG. 23, a bar graph and a line graph are illustrated in relation to each other. The vertical axis of the graph expresses a characteristic value (transmission power or the like) or the evaluation value of the characteristic value. The lateral axis expresses time (working time). The evaluation value includes a normalized value described later. For example, concerning the bar graph, the CPU 110 generates and displays the bar graph, from a normalized value of evaluation by harmonic average of the evaluation point of "transmission power" obtained by "transmission power diagnosis" and the evaluation point of "reception power" obtained by "reception power diagnosis". The length of the bar graph is proportional to the evaluation value. When the numerical value of the evaluation value is larger, this means that the correspondence state is stable and satisfactory.

The screen in FIG. 23 can also display the bar graph by changing colors. For example, the blue color displays "there is correspondence margin", and the yellow color displays "there is no correspondence margin" for clarification. The bar graph point of 0 point indicates that correspondence abnormality has been detected ("correspondence failure" in Step T3 in FIG. 6. In this way, the correspondence margin and one or more characteristic values (transmission power, and the like) obtained from the correspondence signal can be displayed in relation to each other. By displaying the bar graphs that express one or more characteristic values in different colors according to the levels of related correspondence margin, the relation becomes clear.

In the example of FIG. 23, although the points are normalized by 0 point to 10 points, the points may be normalized by 0 to 100 or 0 to 500. In the embodiment, "there is no correspondence margin" is displayed by the evaluation point of 1 to 9 points. The evaluation point of ten points expresses "there is correspondence margin", and the evaluation point of 0 point expresses "correspondence abnormality"

The above harmonic average will be described. For example, the harmonic average point (E) of "transmission power=8 points" and "reception power=6 points" is calculated as $E=(8+6)/2=7$.

By displaying transmission power and reception power by a graph using harmonic average, even the user who lacks in the knowledge of RFID can easily understand the graph by one easy scale of "signal strength". As a modification, each diagnosis parameter may be individually displayed by a graph, without using harmonic average.

Further, a line graph is generated and displayed, from a result of a diagnosis result regarding a separate kind of diagnosis parameter that is different from the bar graph. For example, the normalized value of "surrounding noise amount" obtained by "noise diagnosis is displayed by plotting in the line graph. When the numerical value is smaller, this means that the correspondence state is stable and satisfactory. In the normalization of the line graph, although the points are normalized by 0 point to 10 points, the points may be normalized by 0 to 100 or 0 to 500. In FIG. 23, "there is no correspondence margin" is expressed by 5 points to 10 points. Zero point to 4 points express "there is correspondence margin".

In FIG. 2, the harmonized average value of "transmission power" and "reception power" has been expressed in the bar graph, and "surrounding noise amount" has been expressed in the line graph. As a modification, the three kinds of parameters may be expressed in a numerical value by harmonic average. The user can arbitrarily change by operating a keyboard 104 and the like, the kind of parameters displayed in any bar graph, and the kind of parameters displayed in the line graph.

In this way, in the embodiment, although the characteristic value is displayed by a graph, the kind of graph is not limited to the bar graph and the line graph. The characteristic value may be displayed by using other kind of graph such as a scatter diagram.

(Normalization Method)

Figures 24, 25:
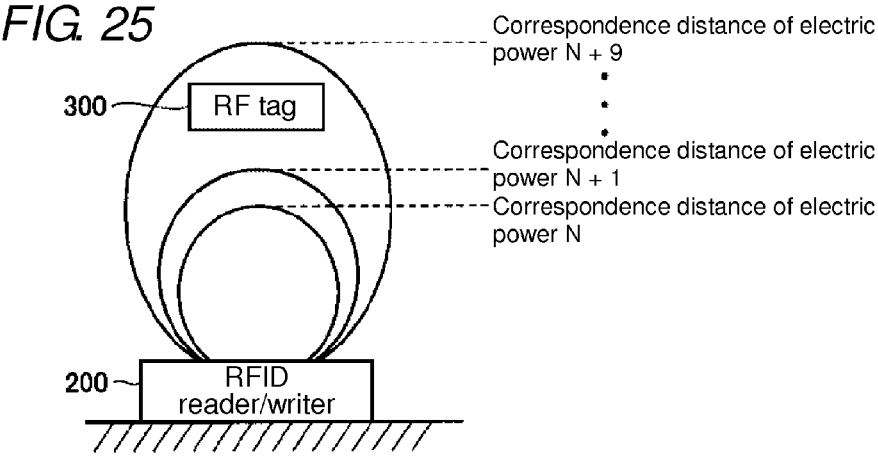
FIG. 24 illustrates in a table format, a transmission power level when transmission power has been switched in stages, and a point allocated corresponding to each level, according to the embodiment.
FIG. 25 schematically illustrates a relationship between transmission power and a correspondence distance in relation to FIG. 24.

FIG. 24 illustrates in a table format, a transmission power level when transmission power has been switched in stages, and point allocated corresponding to each level, according to the embodiment. FIG. 25 schematically illustrates a relationship between transmission power and a correspondence distance in relation to FIG. 24. In the embodiment, the value of transmission power obtained by the correspondence diagnostic processing of the RFID reader/writer 200 expresses transmission power level value RD6. The CPU 110 allocates the points as shown in FIG. 7 to transmission power level value RD6. The point becomes smaller when the correspondence distance becomes longer, and the point becomes larger when the correspondence distance becomes shorter. Accordingly, by obtaining the above evaluation point, the obtained evaluation point can be used for normalization.

According to the point allocation method illustrated in the drawing, the region from the correspondence distance of transmission power N to the correspondence distance of transmission power (N+9) can be set as "region of small correspondence margin" and this region can be notified to the user. In FIG. 24, transmission power is diagnosed by switching the transmission power in N to (N+9) (ten stages). Therefore, the content of "region of small correspondence margin" can be expressed in numerical values by dividing the transmission power in more detail. Consequently, it becomes possible to give to the user an indicator of "additional level of improvement required to shift from "there is small correspondence margin" to "correspondence margin is high".

FIG. 26 is a graph explaining a normalization method of reception power according to the embodiment. The vertical axis of the graph expresses reception power, and the lateral axis expresses a correspondence distance. In FIG. 26, reception power is normalized by numerical values 1 to 10, between the reception power threshold value and noise floor NF. Noise floor NF expresses noise generated due to a circuit characteristic even when there is no surrounding noise.

Concerning the reception power, the reception signal from the RF tag 300 obtained from the reception circuit 220 of the RFID reader/writer 200 is expressed in a numerical value by the A/D conversion circuit 232. For example, when the output of the A/D conversion circuit 232 has a 10 bit length, numerical values of 0 to 1023 are output as a diagnosis result. The output numerical values express reception power level value RD7.

The CPU 110 performs normalization in the width from the maximum reception power (reception power threshold value TH2) obtained in the region of the correspondence distance expressing "caution" to noise floor NF where there is no reception signal from the RF tag 300, as shown in FIG. 26.

For example, when reception power threshold value TH2=800 and also noise floor NF=500 by normalization, normalization is performed at 0 point to 10 points between 500 and 800. At this time, when reception power level value RD7 is "750", normalization is performed by the following expression.

N=Round (10/(800−500)×(750−500)) However, N=0 for (reception power <500), and N=10 for (reception power >800). This calculation expression is an example, and a calculation expression for normalization is not limited to this expression.

Figure 27:
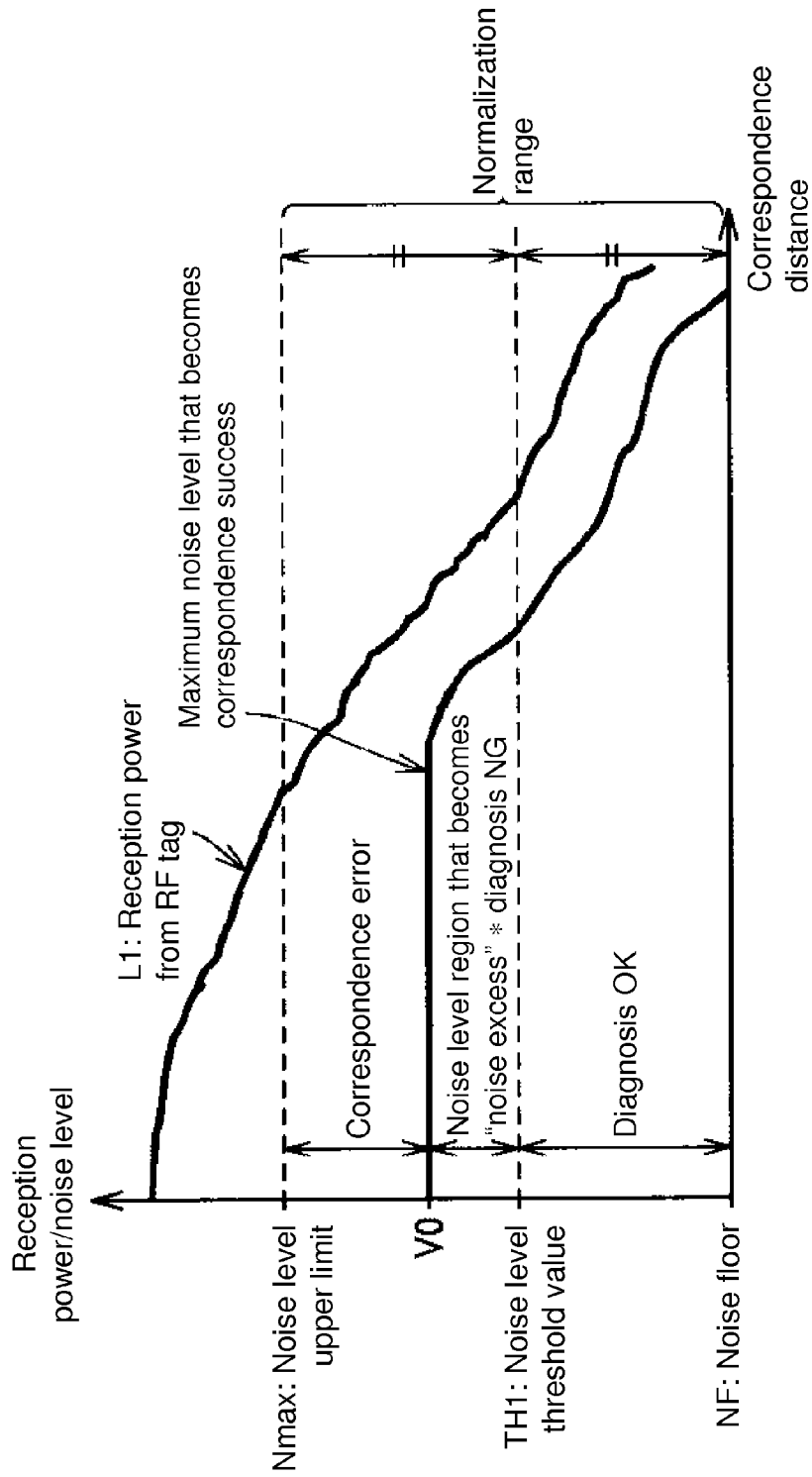
FIG. 27 is a graph explaining a method for normalizing surrounding noise according to the second embodiment of the present invention.

FIG. 27 is a graph explaining a method for normalizing surrounding noise according to the embodiment. The vertical axis of the graph expresses reception power, and the lateral axis expresses a correspondence distance.

Concerning surrounding noise, the surrounding noise is also expressed in numerical values of 0 to 1023 by the A/D conversion circuit 232 of the RFID reader/writer 200, in a similar manner to that of reception power. The output numerical value express a noise level value RD8.

The CPU 110 normalizes the range from noise floor NF to a noise level upper limit value Nmax, as shown in FIG. 26. The noise level upper limit value Nmax is set so that the width from noise floor NF to a noise level threshold value TH1 and the width from the noise level threshold value TH1 to the noise level upper limit value Nmax become equal.

For example, when the noise level threshold value TH1=650, and also when noise floor NF expresses 500, the noise level upper limit value Nmax is calculated as 800. When performing normalization illustrated in FIG. 26 in the normalization range of 0 point to 10 points, the normalization is performed by the following expression when the surrounding noise level obtained by the RFID reader/writer 200 has been "750".

N=Round (10/(800−500)×(750−500)) However, N=0 for (surrounding noise level <500), and N=10 for (surrounding noise level >800). This calculation expression is an example, and a calculation expression for normalization is not limited to this expression.

By this normalization, when normalization has been performed in 0 point to 1 point in the normalization range illustrated in FIG. 27, "there is no correspondence margin" is expressed by at least 5 points at the center, and "there is correspondence margin" is expressed by 4 points and below.

(Other Display Example of Advice)

Figure 28:
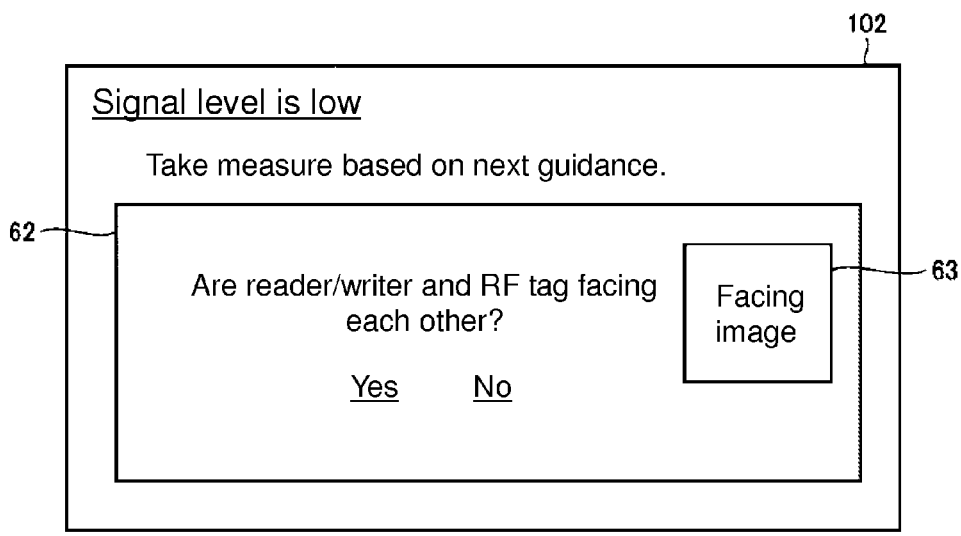
FIG. 28 illustrates an advice display example according to the second embodiment of the present invention.

The guidance data 272 includes data of abnormal content of correspondence abnormality, cause of reduction in correspondence margin, measure items for enhancing correspondence margin, and the like. When the button 55 in FIG. 21 has been operated, display examples of advice of measure read from the guidance data 272 are illustrated. FIG. 28 to FIG. 33 illustrate advice display examples according to the embodiment. In FIG. 28, the display 102 expresses a message display example when it has been diagnosed that transmission power or reception power level, or the S/N ratio has been low. A region 62 expresses the guidance as measure items for enhancing correspondence margin, based on the reduction in the signal level, and a region 63 expresses the image for describing the countermeasure.

Figure 29:
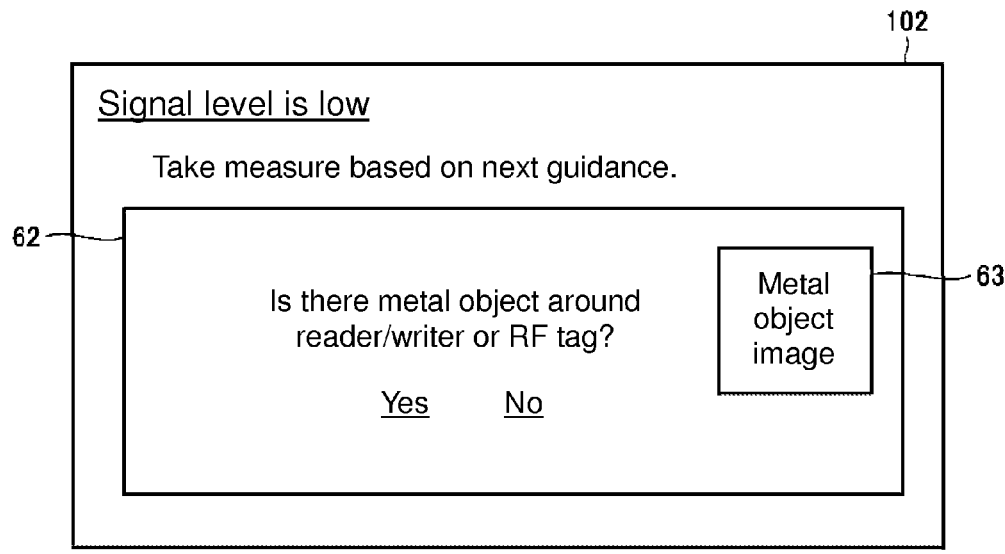
FIG. 29 illustrates an advice display example according to the second embodiment of the present invention.
Figure 30:
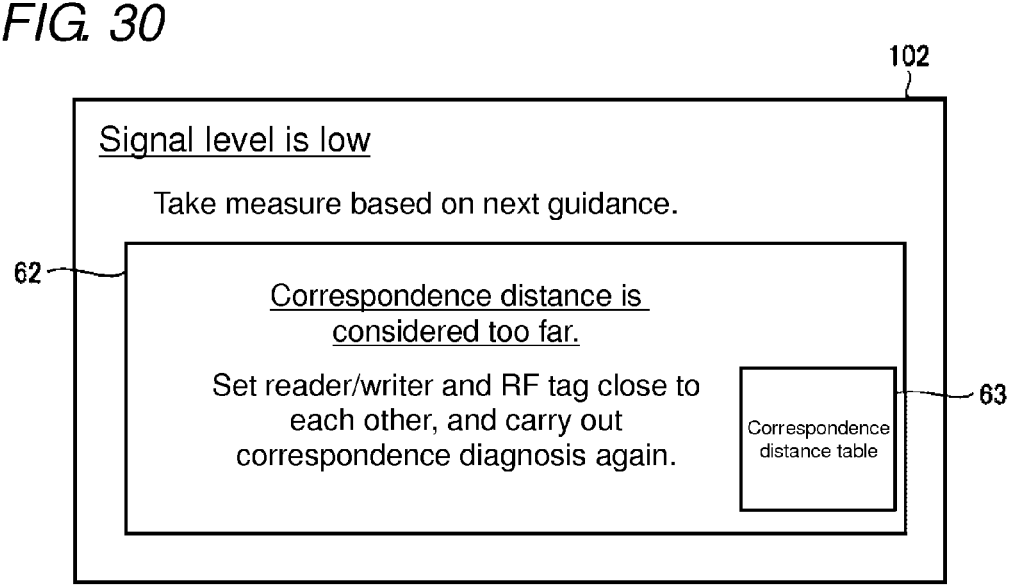
FIG. 30 illustrates an advice display example according to the second embodiment of the present invention.

FIG. 29 illustrates a guidance screen display example of measure items when the transmission power level or reception power level has been low due to the influence of metal surrounding the RFID reader/writer 200 or the RF tag 300. FIG. 30 guides measure items when it is assumed that the correspondence distance is long (too far). The region 63 expresses a correspondence distance table (a correspondence distance and the like determined for each device type) that becomes a reference for adjusting a correspondence distance.

Figure 31:
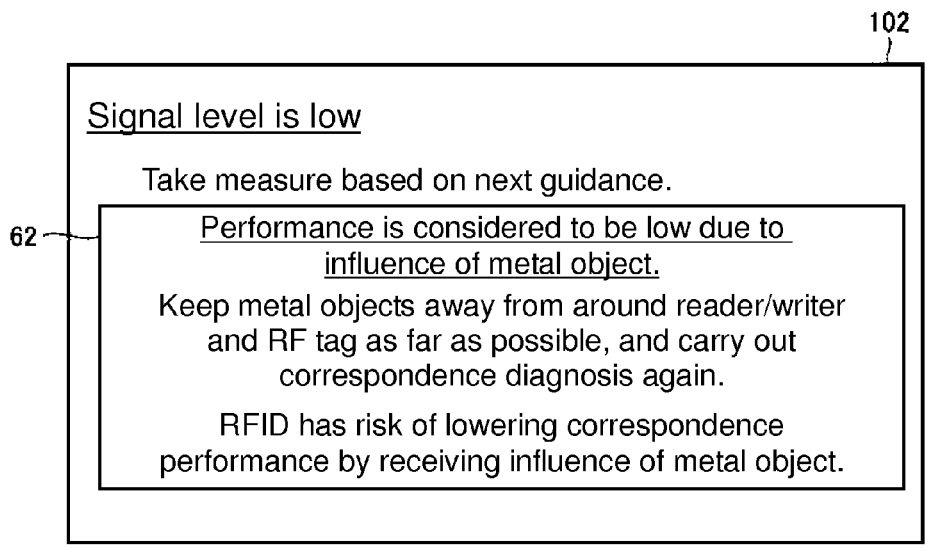
FIG. 31 illustrates an advice display example according to the second embodiment of the present invention.

FIG. 31 illustrates a guidance display example for guiding the measure items when the level of reception power has been low due to the surrounding metal.

Figure 32:
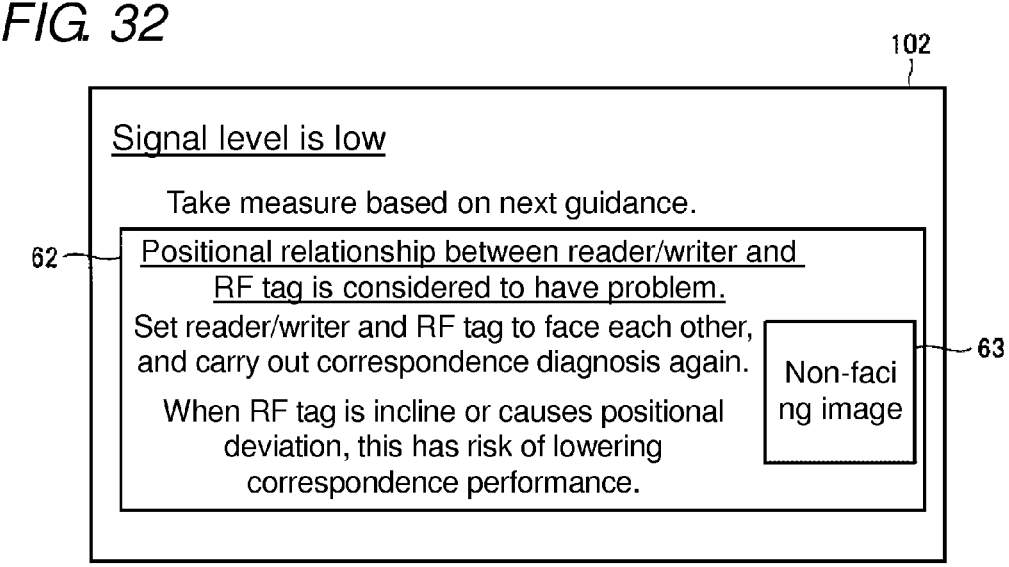
FIG. 32 illustrates an advice display example according to the second embodiment of the present invention.

FIG. 32 illustrates a screen display example for guiding the measure items when it has been diagnosed that the level of reception power has been low due to a positional relationship between the RFID reader/writer 200 and the RF tag 300. The region 63 displays the image that illustrates an inadequate positional relationship between the RFID reader/writer 200 and the RF tag 300. Accordingly, the user can be urged to confirm that the positional relationship is not appropriate.

Figure 33:
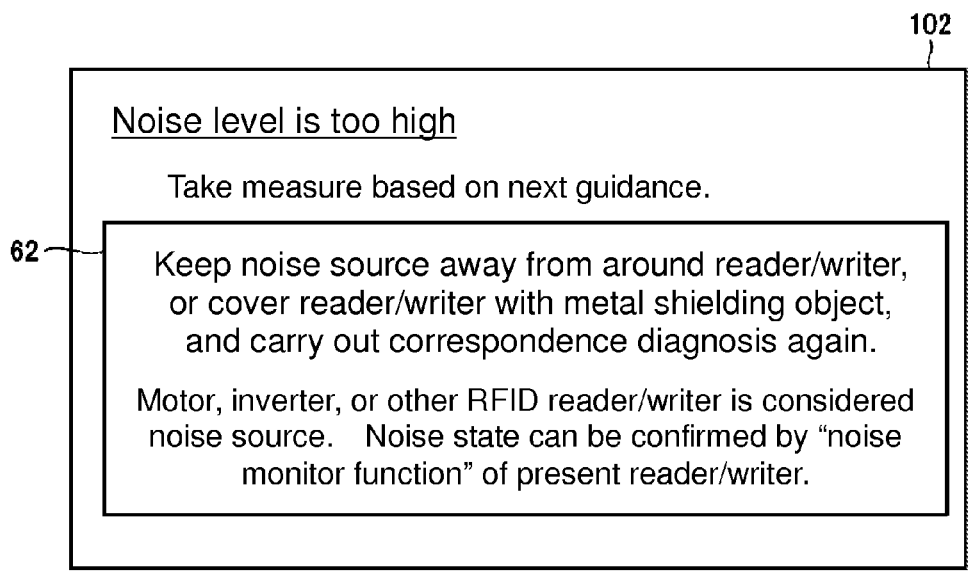
FIG. 33 illustrates an advice display example according to the second embodiment of the present invention.

FIG. 33 illustrates a display screen example for guiding the measure items when "caution" has been diagnosed due to much surrounding noise amount.

Diagnostic information displayed in the screen in the second embodiment includes command execution time, a correspondence result, an abnormality content of correspondence abnormality, and a cause of reduction in correspondence margin. In displaying, these pieces of diagnostic information are displayed in relation to correspondence margin.

The above image display processing includes a program or a combination of a program and a circuit. The image display processing program is stored in the memory medium (memory 112, hard disk 114, memory card 106, and the like) in the high-order device 100. The CPU 110 executes the image display processing by reading and executing the program from the memory medium. In the RFID reader/writer 200, the image display processing program is stored in the memory medium (storage 270, memory card 292, and the like). The CPU 241 realizes the image display processing by reading and executing the program from the memory medium.

MODIFICATION

In the embodiment, the web browser function has been utilized for the access of the diagnostic log 271. However, the access is not limited to the method using the web browser. It may be configured such that the diagnostic log 271 is browsed through application software that operates on the high-order device 100. Alternatively, the information of the diagnostic log 271 may be downloaded to the high-order device 100 by filing the information. The information held in diagnostic log 271 can be erased by operating the high-order device 100.

In the embodiment, the case of displaying in the display 102 by using the HTTP server function has been described. Alternatively, the information may be displayed in the display unit 280.

The image display processing is not limited to be executed by the high-order device 100, and may be executed by the RFID reader/writer 200. In this case, the RFID reader/writer 200 displays the information in the display unit 280 (liquid crystal display and the like) or the display 102.

It should be considered that all aspects of the embodiments disclose here are exemplifications and are not restrictive. The range of the present invention is expressed in claims and not in the above description, and is intended to include all alterations in the meaning and the range equivalent to the claims.

The invention claimed is:

1. An image display processing device comprising:
a processor configured to obtain diagnostic information concerning correspondence when correspondence between an RF tag and an RFID reader/writer is successful; and
a display controller configured to cause a display to display an image based on the diagnostic information, wherein the diagnostic information comprises a correspondence margin based on a characteristic value obtained from a correspondence signal,
wherein the correspondence margin indicates a level by which the value indicated by the obtained characteristic is higher or lower than a threshold value,
wherein the characteristic value is a parameter that can influence correspondence performance,
wherein the diagnostic information comprises a command type transmitted to the RF tag with the correspondence signal, and
wherein the display displays the command type in relation to the correspondence margin.

2. The image display processing device according to claim 1, wherein the display controller is configured to display the correspondence margin in different modes according to a level of the correspondence margin.

3. The image display processing device according to claim 2, wherein the image display processing device is configured to display the correspondence margin in different colors according to the level of the correspondence margin.

4. The image display processing device according to claim 2, wherein the correspondence margin and the characteristic value are displayed in relation to each other.

5. The image display processing device according to claim 4, wherein the characteristic value is displayed in different colors according to levels of a related correspondence margin.

6. The image display processing device according to claim 4, wherein the image display processing device is configured to display the characteristic value by a graph.

7. The image display processing device according to claim 4, wherein the image display processing device comprises a normalized value of a characteristic value measured at a correspondence time.

8. The image display processing device according to claim 1, wherein the image display processing device is configured to display guidance information for enhancing the correspondence margin by relating the guidance information to the correspondence margin.

9. The image display processing device according to claim 1, wherein
the image display processing device is configured to display the correspondence margin and a harmonized average value of two or more characteristic values in relation to each other, and
the harmonized average value comprises a harmonized average value of transmission power and reception power at a correspondence time.

10. The image display processing device according to claim 1, wherein
the image display processing device is configured to display the correspondence margin and a harmonized average value of two or more characteristic values in relation to each other, and
the harmonized average value comprises a harmonized average value of transmission power, reception power, and a noise amount measured at a correspondence time.

11. The image display processing device according to claim 1, wherein
the diagnostic information further comprises a command execution time, a correspondence result, an abnormality content of correspondence abnormality, and a cause of reduction in correspondence margin, and
the display displays the command execution time, the correspondence result, the abnormality content of correspondence abnormality, and the cause of reduction in correspondence margin, in relation to the correspondence margin.

12. A non-transitory computer readable storage medium encoded with an executable computer program for display processing and that, when executed by a, processor, causes the processor to perform operations comprising:
obtaining diagnostic information concerning correspondence when correspondence between an RF tag and an RFID reader/writer is successful, and
displaying an image based on the diagnostic information,
wherein the diagnostic information comprises a correspondence margin based on a characteristic value obtained from a correspondence signal,
wherein the correspondence margin indicates a level by which the value indicated by the obtained characteristic is higher or lower than a threshold value,
wherein the characteristic value is a parameter that can influence correspondence performance,
wherein the diagnostic information comprises a command type transmitted to the RF tag with the correspondence signal, and
wherein the displaying includes displaying the command type in relation to the correspondence margin.

* * * * *